United States Patent
Busch

(10) Patent No.: US 7,592,720 B2
(45) Date of Patent: Sep. 22, 2009

(54) SLIDING DOOR COMPRISING A MAGNETIC DRIVE SYSTEM PROVIDED WITH A PATH MEASURING SYSTEM

(75) Inventor: Sven Busch, Dortmund (DE)

(73) Assignee: Dorma GmbH + Co. KG, Ennepetal (DE)

(*) Notice: Subject to any disclaimer, the term of this patent is extended or adjusted under 35 U.S.C. 154(b) by 115 days.

(21) Appl. No.: 11/795,323

(22) PCT Filed: Dec. 13, 2005

(86) PCT No.: PCT/EP2005/013396

§ 371 (c)(1),
(2), (4) Date: Jul. 16, 2007

(87) PCT Pub. No.: WO2006/074783

PCT Pub. Date: Jul. 20, 2006

(65) Prior Publication Data

US 2008/0088188 A1    Apr. 17, 2008

(30) Foreign Application Priority Data

Jan. 14, 2005   (DE) .................. 10 2005 002 046

(51) Int. Cl.
*H02K 41/00* (2006.01)
(52) U.S. Cl. ....................................................... 310/12
(58) Field of Classification Search ............. 310/12–14, 310/156.38, 68 B; 318/135, 490
See application file for complete search history.

(56) References Cited

U.S. PATENT DOCUMENTS 5,134,324 A * 7/1992 Sakagami et al. ............. 310/12
5,684,344 A * 11/1997 Takei ........................... 310/12
5,909,066 A * 6/1999 Nanba et al. ................. 310/12

FOREIGN PATENT DOCUMENTS

| DE | 40 16 948 | 11/1991 |
|---|---|---|
| DE | 196 18 518 | 3/1998 |
| EP | 0 351 490 | 1/1990 |
| EP | 0 433 830 | 6/1991 |
| JP | 08-275493 | 10/1996 |
| WO | WO 94/13055 | 6/1994 |
| WO | WO 00/50719 | 8/2000 |

OTHER PUBLICATIONS

Search Report dated May 29, 2006 for the underlying International Application No. PCT/EP2005/013396.

* cited by examiner

*Primary Examiner*—Michael C Zarroli
(74) *Attorney, Agent, or Firm*—Cohen Pontani Lieberman & Pavane LLP

(57) ABSTRACT

A magnetic drive system for a door leaf includes a carrying slide for carrying the door leaf; a row of magnets disposed in the driving direction and having a length L and a longitudinal direction, the magnets being arranged so that magnetizations of the magnets reverse at a predetermined interval in the longitudinal direction; a coil arrangement comprising coil cores and coils which are wound around respective coil cores; and a displacement measuring system comprising a first magnetically sensitive position sensor and a second magnetically sensitive position sensor which is separated from the first position sensor by a distance A. The distance A is larger than the difference between the length L and the travel path V and smaller than the length L.

21 Claims, 20 Drawing Sheets

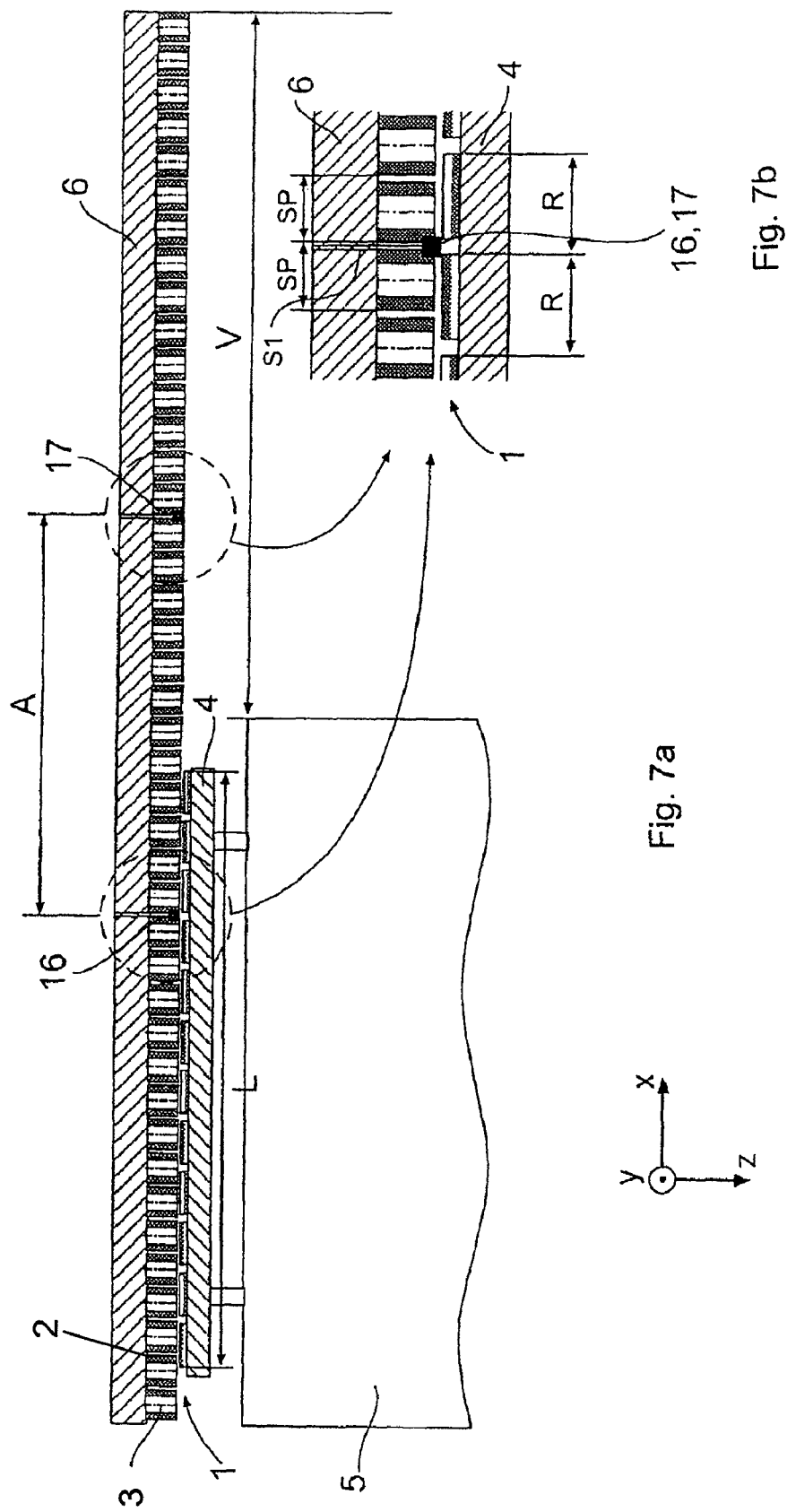

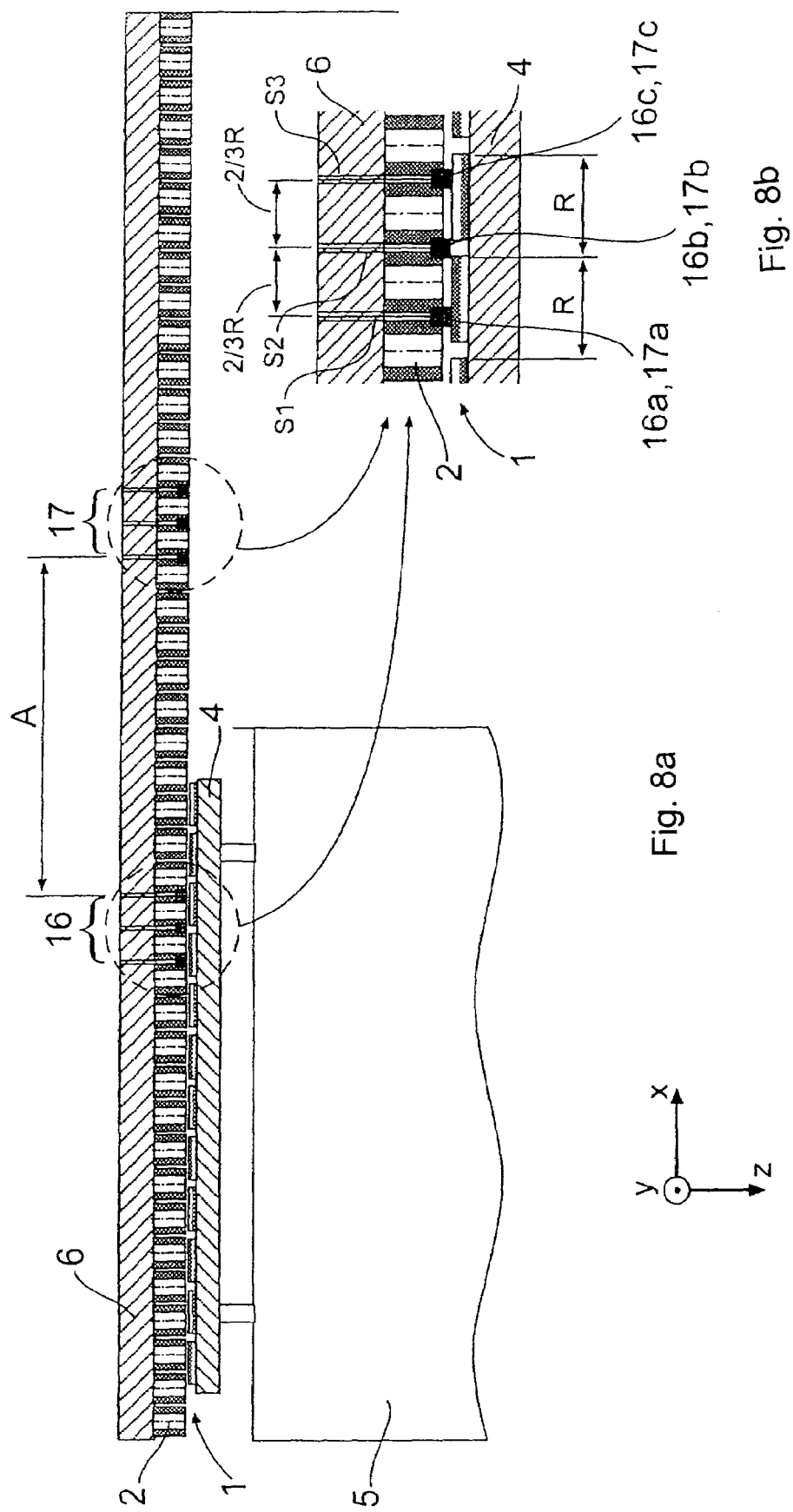

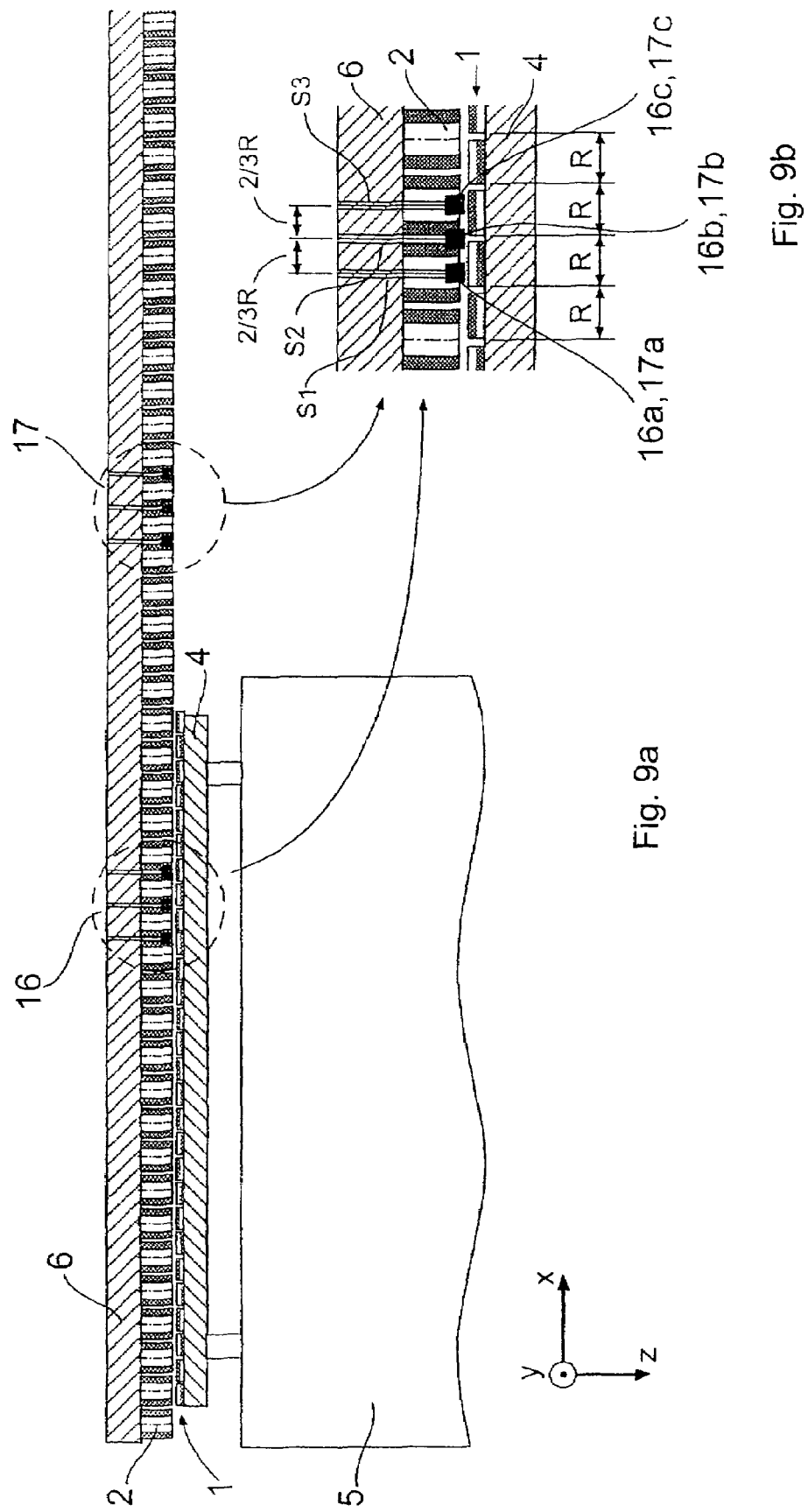

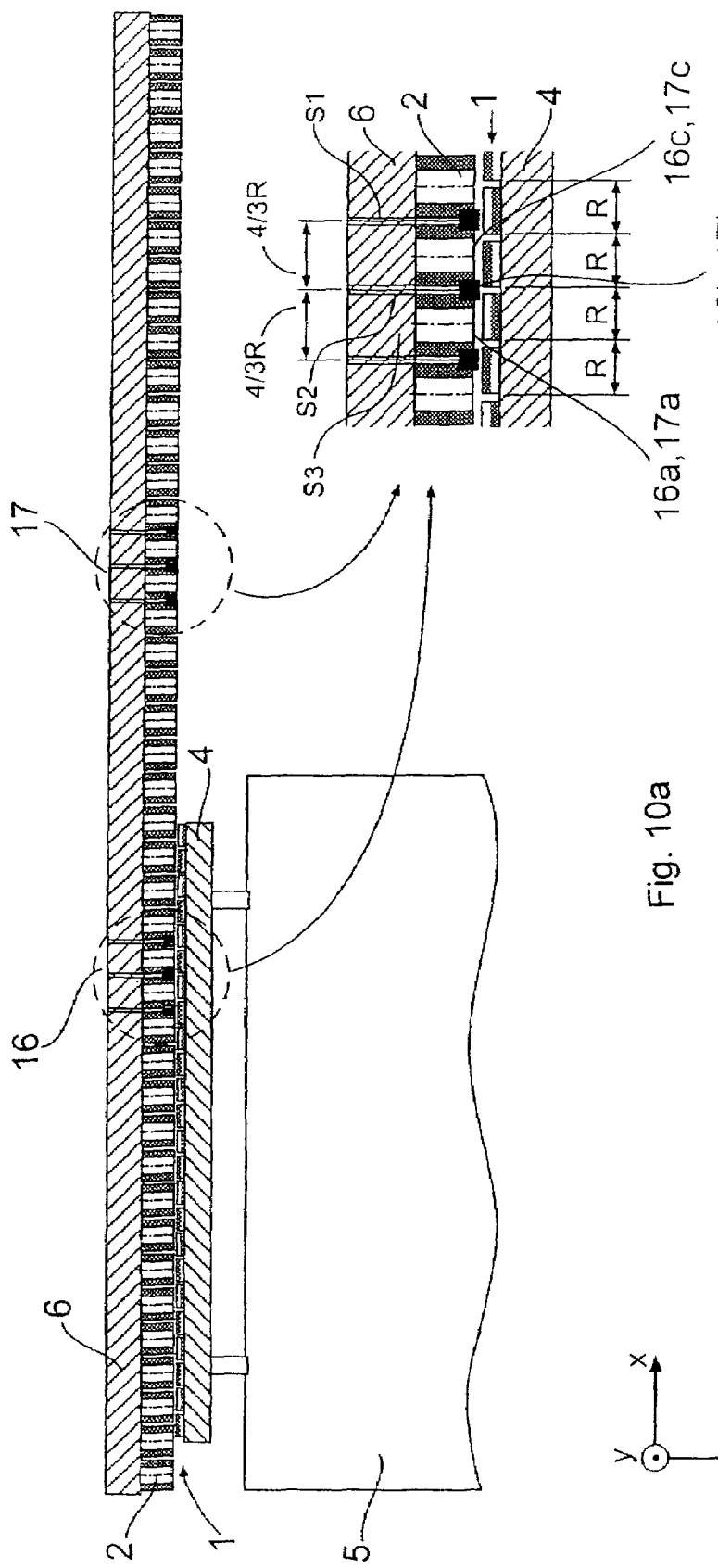

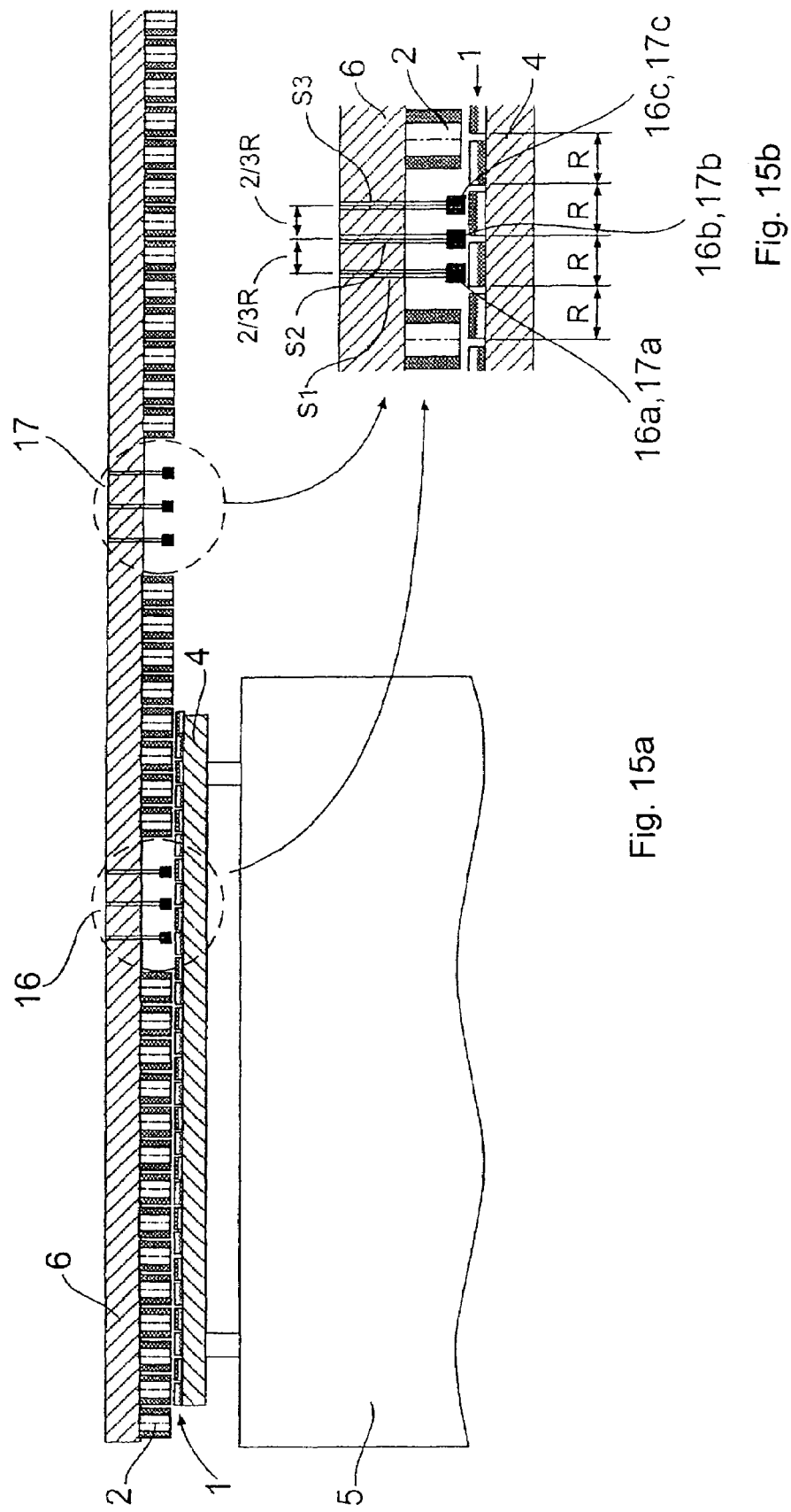

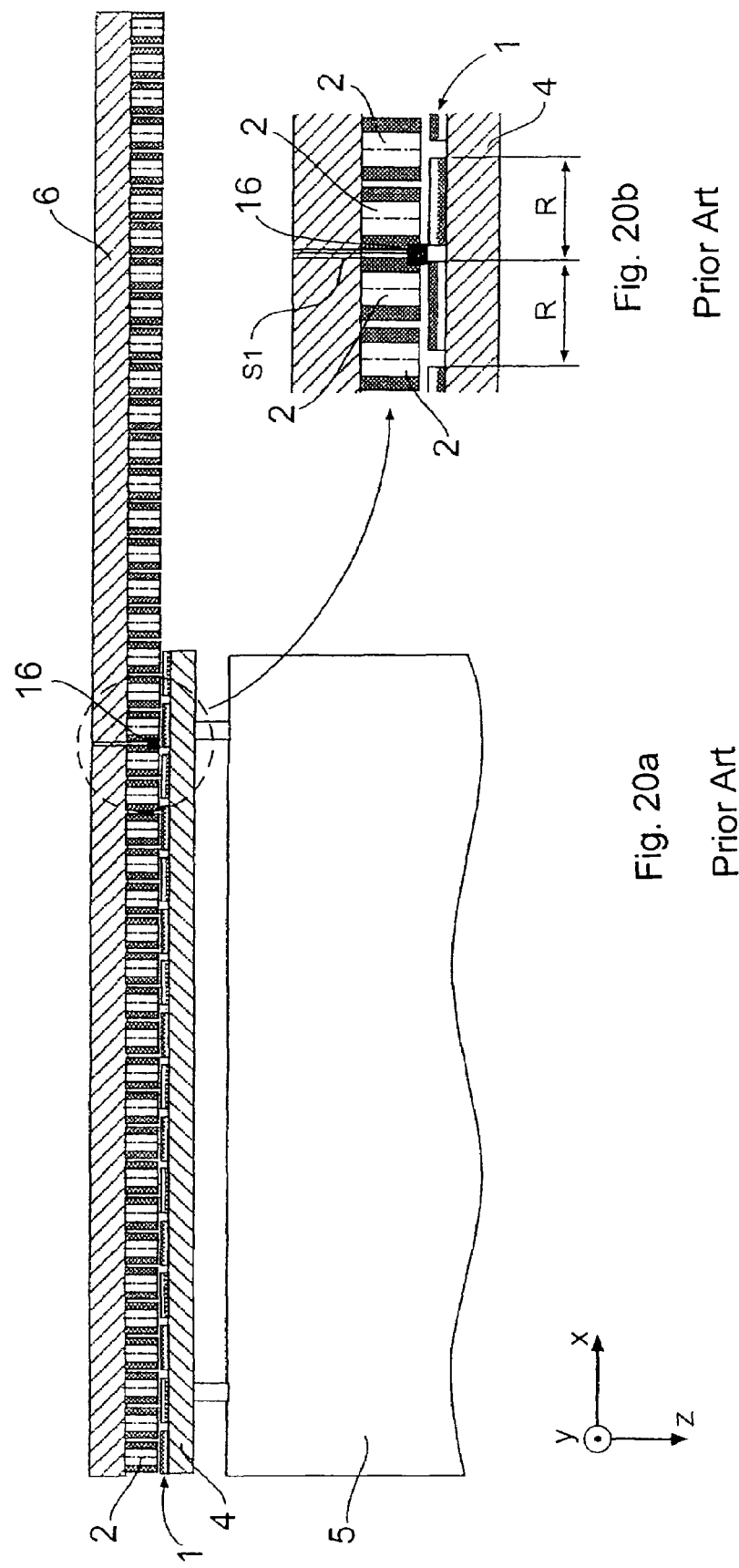

SLIDING DOOR COMPRISING A MAGNETIC DRIVE SYSTEM PROVIDED WITH A PATH MEASURING SYSTEM

CROSS-REFERENCE TO RELATED APPLICATIONS

This is a U.S. national stage of International Application No. PCT/EP2005/013396, filed on 13 Dec. 2005. Priority is claimed on German Application No. 10 2005 002 046.1, filed on Jan. 14, 2005.

BACKGROUND OF THE INVENTION

1. Field of the Invention

The invention relates to a sliding door with a magnetic drive system including a displacement measuring system. The magnetic drive system has a linear drive unit with at least one row of magnets. The term "row of magnets" comprises oblong individual magnets as well. The row of magnets can be stationary or non-stationary. Preferably, the magnetic drive system is formed as a magnetic carrying and drive system.

2. Description of the Related Art

A sliding door guide is known from DE 40 16 948 A1, wherein, under normal load, magnets, interacting with one another, effect a contact-free floating guidance of a door leaf or the like, which leaf is maintained in a sliding guide, in addition to the stationary disposed magnets of the sliding guide, a stator of a linear motor being provided, the rotor thereof being disposed at the sliding door. On account of the selected V-shaped disposition of the permanent magnets of the disclosed permanently excited magnetic carrying device, a laterally stable guiding path can not be realized, hence a relatively complicated disposition and configuration of stator and rotor are required.

A combined support and drive system for an automatically operated door is known from WO 00/50719 A1, wherein a permanently excited magnetic carrying system is symmetrically designed and has stationary and non-stationary rows of magnets, which are respectively disposed in one plane, the carrying system being in an unstable equilibrium, and wherein the carrying system has symmetrically disposed lateral guiding elements, which may have roller-shaped supports. The thus achieved laterally stable guiding path results in a simple configuration and disposition of stator and rotor of a linear motor accommodated in a common housing, namely the option of being able to arbitrarily dispose the stator and the rotor of the linear motor in relation to the carrying system and of experiencing no limitations by the carrying system as to the shape of stator and rotor.

These two support systems have in common that they function according to the principle of repulsive forces, which principle of action allows for a stable poise without requiring an expensive electrical control device. However, the drawback therein is that both, at least one stationary and at least one non-stationary row of magnets need to be provided, i.e. magnets need to be disposed along the whole path of the sliding guide or of the bearing of the automatically operated door and at the carrying slide for the door, which slide is movable along this guide, thus making the production of such system very costly, which on the other hand, is distinguished by an extremely soft-running and silent operation and is almost wear-free and maintenance free, as the mechanical friction necessary for carrying the door has been obviated.

Another electromagnetic drive system for magnetic floating and carrying systems is known from DE 196 18 518 C1, wherein a stable floating and carrying state is achieved through an appropriate disposition of a permanent magnet and ferromagnetic material. For this purpose, the permanent magnet brings the ferromagnetic material in a state of partial magnetic saturation. Electromagnets are disposed such that the permanent magnets are moved exclusively by changing the saturation in the carrying rail, and the coil cores are included in the permanent magnetic partial saturation, which results in the floating and carrying state.

WO 94/13055 further shows a stator drive for an electric linear drive and a door, which is equipped with such a stator and suspended by means of magnets at the door lintel of a frame. For this purpose, several magnets or groups of magnets are disposed at the door panel, their magnetic field strength being so important that an attractive force to a guiding plate, disposed at the underside of the door lintel is achieved, whereby this attractive force is sufficient to lift the weight of the door.

The two systems described in these publications have in common that the magnets are prevented from sticking to the ferromagnetic material by means of rollers, that is an air gap between the magnets and the ferromagnetic material is adjusted by means of rollers. In the chosen dispositions, these rollers have to absorb important forces, as the magnetic field strength can not be chosen such that just the respective magnetically suspended door is maintained, but, on account of safety regulations, a predetermined additional portative force needs to be provided to avoid an unintentional drop of the door. Therefore, the rollers need to be designed similarly to purely roller-supported sliding doors, with the result of a mechanical friction occurring when adjusting the air gap. This friction neutralizes the extreme soft-running and silent operation of the support, working according to the principle of repulsive forces, and leads to wear and maintenance. In addition during manufacturing already, the magnetic attractive force needs to be adjusted precisely to the respective load to be carried, therefore these systems are not suitable for the practical application or they are too expensive.

Furthermore, these publications certainly state the use of a linear drive coupled to or integral with a magnetic carrying device; however, the configuration of such a linear drive or the activation thereof are not described.

For operating a linear motor for a sliding door drive, a measuring system for detecting the current position of the door leaf respectively of the rotor is required for several tasks:
1. The rotor position is detected in order to be able to vary the phase voltage depending on the rotor position for commutating the stator such that a continuous motor thrust is generated. Preferably the voltage has a sinusoidal modulation.
2. The travel path is measured for regulating the door speed.
3. The door speed is derived from the position signal for regulating the door speed and for detecting obstacles.
4. The detection of final positions and a measurement of the possible travel path are realized in a reference run.

With linear motors various analogous and incremental displacement measurement processes are known, which generally are designed as systems independent of the linear motor, such that their measurement results need to be converted to the motor raster for the commutation. Furthermore, a relation between the electrical phase position and the measured rotor position needs to be determined by means of a rotor position search.

Furthermore, it is known that the row of permanent magnets of the rotor can be scanned by means of a Hall sensor or another magnetically sensitive electrical sensor. A system suitable for this purpose is shown in FIG. 20a, in which, seen in the direction of travelling x, in the centre of individual coils 2 of the stator, a Hall sensor 16, serving as a position sensor, is disposed, which emits a signal S1 generated by displacing the individual magnets of the row of magnets 1, having a pole distance R, along the Hall sensor 16. This signal is shown in FIG. 21.

The advantages of such a displacement measuring system in comparison to systems, which are independent of the linear motor, are the following:

1. Cost advantage, because the magnetic scale is already provided and Hall sensors are relatively inexpensive.
2. The rotor position search can be forgone, because a fixed relationship between the measurement signal of the rotor position and the coil positions of the stator of the linear motor is given on account of the mounting position of the Hall sensor. Furthermore, loosing the position relation, which is possible with external systems, is excluded on account of the fixed geometrical allocation.

The disadvantages, when using a Hall sensor for the displacement detection may be the following:

1. Inherent to design, the length of the row of magnets on the rotor can be shorter than the travel path of the door such that the rotor moves out of the measuring range, as shown in FIG. 22a.
2. On account of geometrical tolerances between the permanent magnets, differing material properties and quality, the maximal field strengths of the individual magnets of a row of magnets have noticeable discrepancies, such that the evaluation is more difficult and the result of the measurement inaccurate. The output signal S1 of the Hall sensor 16 shown in FIG. 21, shows e.g. an amplitude difference D between the third and fourth maximum, which is caused by said reasons.
3. The course of the measured values depending on the rotor position depends on the disposition of the magnets, the choice of sensors and the sensor position. Generally, the output signal of the position sensor is similar to a sinus function, as can be seen clearly seen in FIG. 21, showing the output signal S1 of the Hall sensor 16.
4. Exclusively the steep portions of the sinusoidal result function of the Hall sensor 16 can be evaluated analogously with sufficient precision. In the areas of little slope of the maxima and minima of the functional course, an analogous function evaluation is not possible, as can be clearly seen in FIG. 21 showing the output signal S1 of the Hall sensor 16.
5. With the motor being switched on, the fields of the individual magnets of the row of magnets 1 are superimposed by the fields of the drive coils, such that there is interference in the magnetic fields of the individual magnets of the row of magnets 1 and the result of the measurement is corrupted.

SUMMARY OF THE INVENTION

Therefore, it is an object of the invention to further develop a sliding door with a magnetic drive system for at least one door leaf, which has a linear drive unit with at least one row of magnets and a displacement measuring system with a position sensor, the system cooperating with the row of magnets as a magnetic measuring scale, such that the above mentioned advantages of low production cost are maintained and a simple and reliable position detection is guaranteed.

The object is achieved by an inventive sliding door comprises a magnetic drive system for at least one door leaf, with a row of magnets disposed in driving direction, the magnetization thereof changing the sign in its longitudinal direction at certain intervals, and with a carrying slide connected to the row of magnets and at which slide the door leaf can be attached, as well as with a coil arrangement consisting of several individual coils and coil cores, which arrangement, upon appropriate activation of the individual coils, causes an interaction with the row of magnets generating advance forces, and with a displacement measuring system cooperating with the row of magnets as a magnetic measuring scale having a first magnetically sensitive position sensor, the displacement measuring system having a second magnetically sensitive position sensor, the distance thereof to the first position sensor being larger than the difference between the length of the row of magnets and the travel path of the sliding door, and being smaller than the length of the row of magnets.

By using at least two position sensors, which may each comprise several individual sensors, according to the invention, the travel path is subdivided into at least two measuring ranges such that travel paths of the door will be possible, which are longer than the length of the row of magnets of the rotor.

Before the row of magnets of the rotor has left the measuring range of one position sensor, according to the invention, a second position sensor assumes the displacement measurement, because the distance of the two magnetically sensitive position sensors is smaller than the length of the row of magnets of the rotor.

The switching and synchronising of the sensors is realized via an electronic control of the displacement measuring system. In this case, the switching and synchronising can be realized by means of a hardware control or by means of appropriate software through a micro-controller.

In the inventive sliding door, the distance between the first position sensor and the second position sensor is preferably larger by at least one magnetic pole distance between two individual magnets of the row of magnets than the difference between the length of the row of magnets and the travel path of the sliding door and smaller by at least one magnetic pole distance between the two individual magnets of the row of magnets than the length of the row of magnets. On account of this preferred choice of the distance between two position sensors, according to the invention, a reliable superimposition of the at least two measuring ranges is achieved.

In the inventive sliding door, alternatively or additionally, the distance between the first position sensor and the second position sensor preferably amounts to a multiple of a magnetic pole distance between two individual magnets of the row of magnets and simultaneously to a multiple of a coil distance between two individual magnets. Thereby the two magnetically sensitive position sensors generate the same measuring signals adapted to the respective coil group, whereby the otherwise costly necessary synchronisation and conversion of the displacement signals during the evaluation and the synchronisation of the at least two position sensors is eliminated. Furthermore, on account of the fixed allocation of sensors and the phase position of the individual coils, a maximum of functional reliability is achieved.

According to the invention, Hall sensors and/or magneto-resistive sensors are used as the magnetically sensitive position sensors.

In the inventive sliding door, the magnetically sensitive position sensors consist preferably of several magnetically sensitive individual sensors respectively, and even more preferred of two or three individual sensors.

According to the invention, the magnetically sensitive individual sensors of a magnetically sensitive position sensor, preferably have a fixed distance with regard to each other such that always at least one of the individual sensors shows a steep functional course. For the generation of a precise continuous displacement signal, the output signals of the magnetically sensitive sensors in this inventively preferred embodiment are then evaluated such that only the areas of the output signal having an important slope are considered with priority for the evaluation. With a more favourable choice for the distance of the sensors, a new enhanced total signal can be composed of the combined individual output signals. The composition of the signal courses of the individual sensors of a position sensor to form an enhanced total signal is carried out via the electronic control of the displacement measuring system. In this case, the simplest possibility is to utilize each time the measured values of the respective output signals for the enhanced total signal, which are closer to the central position (generally 0-position) of the periodic output signals.

Alternatively or additionally according to the invention, the number of the magnetically sensitive individual sensors of each magnetically sensitive position sensor preferably corresponds to the number of the electrical phases of the drive system. In this embodiment, the repetition rate of the output signal is synchronous to the frequency of the sinusoidal motor voltage to be produced. The use of two or four individual sensors per position sensor is particularly suitable with two-phase or four-phase drive motors. In the particularly advantageous three-phase drive motor, the use of at least three individual sensors per position sensor is particularly advantageous.

Furthermore, alternatively or additionally, according to the invention, the preferably magnetically sensitive individual sensors of a magnetically sensitive position sensor have a fixed distance with regard to each other, which equals the quotient of the magnetic pole distance between two individual magnets of the row of magnets and the number of the utilized individual sensors in the position sensor, or a multiple thereof.

This choice for the distance of the individual sensors, which is preferably equal to the pole distance R of the individual magnets of the row of magnets (distance between the centres of two adjacent magnets) divided by the number of utilized individual sensors of one position sensor or a multiple of this distance, is particularly advantageous, because it results in a total signal which is easy to evaluate.

With a two-phase or four-phase drive motor, a distance S of the individual sensors of a position sensor of $S = R \cdot n \cdot \frac{1}{2}$ with $n = \{1, 2, 3 \ldots \}$ and with a pole distance R is advantageous, because, with this distance, in the area of the local maxima of an output signal of the one individual sensor (little slope), the output signal of the respective other individual sensor has its highest slope in the 0-passage and vice versa.

With the particularly advantageous three-phase drive motor, the distance S of $S = R \cdot \{\frac{1}{3}, \frac{2}{3}, \frac{4}{3}, \frac{5}{3} \ldots \}$ between two adjacent individual sensors of a position sensor with the pole distance R is advantageous. In particular a distance of $S = R \cdot \frac{2}{3}$ between two individual sensors results in a very regular, sectionally almost linear output signal, which is synchronous to the advance switching frequency of a three-phase linear motor.

In the inventive sliding door, the magnetically sensitive position sensors measure preferably only the field direction independently of the field strength. For this purpose, furthermore according to the invention, preferably magneto-resistive position sensors are used.

The field direction compared to the field strength is far less influenced by the tolerances of the magnets such that on account of this inventive further development, a more precise displacement signal can be sampled. Furthermore, special position sensors can be utilized, which show a zero passage for the output signal at a 0°, 90°, 180° and at a 270° field direction with regard to the sensor surface and they show as well a maximum or minimum measuring voltage at 45°, 135°, 225° and 315° respectively. Such sensors, compared to sensors which are dependent of the field strength, achieve twice the measurement resolution. Advantageously, the distances of such individual sensors in a position sensor may be reduced to half of the above described distances.

Furthermore, the inventive sliding door preferably has magnetically conductive keepers which improve a field closing of the individual magnets of the row of magnets via the magnetically sensitive position sensors. Moreover, according to the invention, the magnetically conductive keepers preferably consist of a soft-magnetic material.

This preferred configuration of the inventive sliding door generates a field strengthening effect in the area of the position sensors. The preferably utilized soft-magnetic material of the keeper may be iron or steel, for example.

As the fields of the coils are not strengthened to the same extent through the keeper, the displacement signal of the individual magnets is enhanced. The arrangement of the magnetically sensitive position sensor and keeper between the individual coils or laterally to the individual coils is particularly advantageous. The magnetically sensitive position sensor may be disposed directly opposite the individual magnets of the row of magnets in the area of the air gap or between the keepers. The latter disposition reduces the effect of the field direction on the measured field strength, because the field direction between two fixed keepers is almost independent of the rotor position.

Moreover, alternatively or additionally, the inventive sliding door preferably has shielding elements, which surround the magnetically sensitive position sensors such that an interference effect from leakage fields of the individual coils on the magnetically sensitive position sensors is reduced. According to the invention, the shielding elements consist furthermore preferably of a magnetic field conducting material, such as iron or steel. According to the invention, such a shielding component may surround the sensor totally or partially and, with an opening, point to the permanent magnets.

Such a shielding element results in guiding the magnetic fields of the coils around the position sensor far more intensively than the fields of the individual magnets of the row of magnets of the rotor, because the opening of the shielding housing points in the direction of the individual magnets.

Alternatively or additionally, the coil arrangement of the individual coils of the inventive sliding door is preferably interrupted in the close range of the magnetically sensitive position sensors. The individual coils of the coil arrangement, namely the electromagnetic drive coils of the stator, generally extend across a greater length, and their phase pattern is repeated several times, such that omitting single individual coils or a coil group (respectively one individual coil of each phase position) does not have any appreciable effect on the propulsion thrust.

Furthermore, alternatively or additionally, the coil arrangement of the individual coils of the inventive sliding door is disposed at a distance to the magnetically sensitive position sensors between the magnetically sensitive position sensors. This inventive configuration is a particularly simple possibility to avoid the problem of interference fields generated by the drive coils. In order to guarantee, in this disposition of the position sensors with sufficient distance in front of and behind the individual coils of the coil arrangement, namely the stator, that the rotor still can never move out of the detection area of the two position sensors, the distance of the position sensors must be smaller than the length of the row of magnets of the rotor. Consequently, the stator needs to be even slightly shorter than this sensor distance. Therefore, this embodiment is particularly suitable for the use with a relatively short stator.

These last four configurations of the invention, namely the use of the keepers, shielding elements, the interruption of the coil arrangement in the area of the position sensors and the use of a short stator disposed between the position sensors, which configurations can be executed alternatively or together in an optional combination, reduce or completely block out an effect of the magnetic fields of the electromagnetic drive coils of the sliding door drive, which effect, in some cases, interferes considerably with the displacement measurement.

Furthermore, the inventive sliding door, preferably for each door leaf, has a roller arrangement connected to the row of magnets fulfilling a carrying function with regard to the door leaf and guaranteeing a certain gap-shaped distance between the row of magnets and the coil cores.

Through such a conception of the magnetic drive system as a magnetic carrying and drive system, in which the required portative force is partly absorbed by the magnetic carrying and drive system and partly by the roller arrangement, compared to the state of the art, the advantage is achieved that the roller arrangement neither has to carry the whole load of the door leaf, nor must it absorb an important portative force required on account of safety regulations in case of door leaves, which are purely suspended by means of magnets. Compared to a pure roller support, respectively to a magnetic suspension assisted by rollers, the following advantages are thereby achieved: longer operating life of the rollers, reduction of the roller size and thus reduction of construction space requirement with regard to the roller support and a reduction of rolling noises, reduction of the rolling resistance, respectively of the roller friction. Furthermore, this configuration of the inventive sliding door, compared to a pure magnetic carrying and guiding system, offers the advantages that, when designing the system, the rigidity of the portative force characteristic curve does not need to be considered; when accelerating and decelerating, no swaying motion of the carried load occurs, e.g. of the door leaf, and in that different deflections with different door leaf weights do not need to be considered nor compensated. Furthermore, the thus embodied inventive magnetic carrying and drive system for at least one door leaf can be manufactured without any differences in series without considering the actual later use, i.e. without requiring any adjustment to the weight to be carried later during manufacturing.

For these reasons and according to the invention, such a support, working according to the principle of attractive forces, achieves a very smooth running and a silent functioning, wherein, on account of the employed roller arrangement, which guarantees the certain gap-shaped distance between the row of magnets and the coil arrangement, there is no need to provide an electric or electronic control system, despite utilizing an unstable state of equilibrium. A gap-shaped distance according to the idea of the invention, is a distance between two parallel faces or faces slightly inclined towards each other, in this case, particularly between a pole face of one (of the at least one) row of magnets and a surface, opposite thereto and substantially parallel thereto, of the coil cores of the coil arrangement.

In the inventive carrying device, the row of magnets is magnetized preferably parallel to the carrying direction and perpendicular to the driving direction.

According to the invention, the row of magnets preferably consists of one or more high energy magnets, preferably of rare earth high energy magnets, further preferably of neodymium-iron-boron (NeFeB), or of samarium cobalt ($Sm_2Co$) or of plastic-bound magnetic materials. By using such high energy magnets, it is possible, on account of their higher residual induction, to generate considerably higher force densities than with ferrite magnets. Therefore, with a given portative force and with high energy magnets, the magnetic system can have small geometric dimensions and thus be built in a space-saving manner. The higher material cost of the high energy magnets compared to ferrite magnets is at least compensated by the relatively small volume of the magnets.

The inventive drive system or the combined carrying and drive system is used for driving of at least one door leaf of a sliding door, which is preferably formed as a curved sliding door or as a horizontal sliding wall. In addition to this application, it may be used as a drive for gate leaves or in feeding devices, handling equipment or transport systems.

BRIEF DESCRIPTION OF THE DRAWINGS

The invention will now be described in more detail, based on diagrammatically illustrated exemplary embodiments, in which:

FIG. 7a shows a first preferred embodiment of the disposition of position sensors according to the invention;

FIG. 7b shows a partial enlarged view of the combined carrying and drive system;

FIGS. 8a and 8b show a second preferred embodiment of the disposition of position sensors according to the invention;

FIGS. 9a and 9b show a third preferred embodiment of the disposition of position sensors according to the invention;

FIGS. 10a and 10b show a fourth preferred embodiment of the disposition of position sensors according to the invention;

FIGS. 15a and 15b show a fifth preferred embodiment of the disposition of position sensors according to the invention;

FIGS. 20a and 20b show a first embodiment of the disposition of position sensors according to the state-of-the-art;

DETAILED DESCRIPTION OF THE PREFERRED EMBODIMENTS

Figure 1:
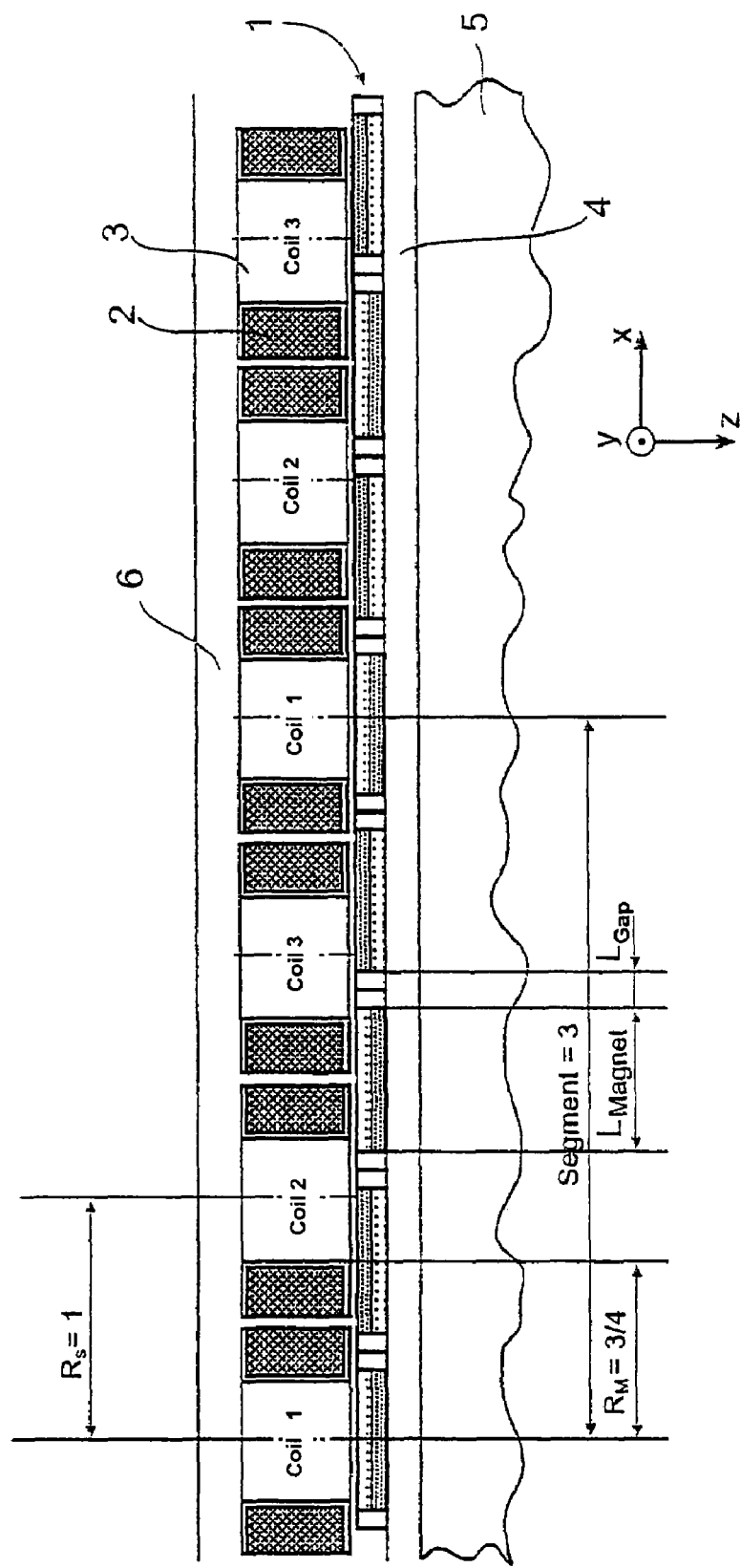
FIG. 1 shows a longitudinal sectional illustration of the inventively basically used combined carrying and drive system.

FIG. 1 shows a basic diagrammatic illustration of two drive segments of an inventively preferably used drive system, here as a combined magnetic carrying and drive system in a longitudinal section, in which the inventively used magnetic linear drive acts upon the row of magnets 1, which is attached at a carrying slide 4 holding a door leaf 5. The row of magnets 1 is attached at a carrying profile 6 and has individual magnets with respectively alternating polarity. In carrying direction above the row of magnets 1, coils 2 are disposed at a certain gap-shaped distance such that a respective coil core 3 extends in the carrying direction, i.e. z-direction. The coil cores are in action of attractive force with the row of magnets 1 and thus generate part of a portative force for the door leaf 5.

In order to guarantee a continuous-advance of the row of magnets 1, the stator coils 2 with their respective coil cores 3 are disposed at different relative positions with regard to the raster of the permanent magnets. The more different relative positions are formed, the more uniformly the thrust force can be realized along the travel path. As, on the other hand, each relative position is to be assigned to an electric phase of an activation system required for the linear drive, the least possible amount of electrical phases should be employed. On account of the provided three-phase network, a three-phase system, as shown as an example in FIG. 2, can be built very inexpensively.

In this case, a respective drive segment, and thus a coil module of the linear drive unit, consists of three coils, which have an extension of three length units in driving direction, i.e. x-direction, wherein thus a raster Rs=1 length unit is located between the centres of adjacent coil cores 3. In this case, the length of a magnet of the row of magnets 1 in driving direction and the length of the gap located between the individual magnets of the row of magnets 1 is selected such that the length of a magnet $L_{Magnet}$+length of a gap $L_{Gap}$=magnet raster $R_M$=¾ length unit (=¾$R_S$).

Figure 2:
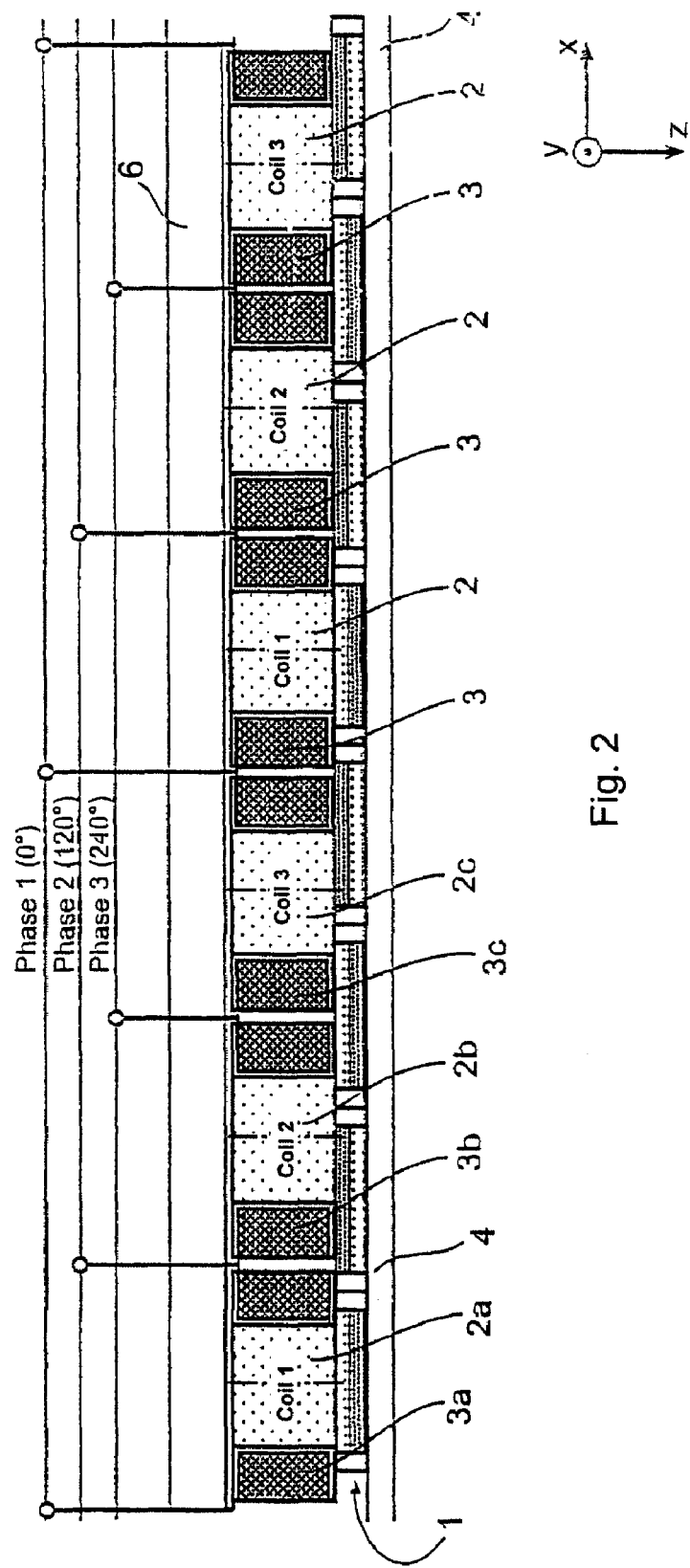
FIG. 2 shows an electrical interconnection of the coils of the linear drive unit of the combined carrying and drive system shown in FIG. 1.

FIG. 2 shows the interconnection of the coils of the two drive segments of the inventively preferably used linear drive unit shown in FIG. 1. In this case, a first coil 2a with a first coil core 3a is connected between a first phase and a second phase of a three-phase network consisting of three phases, which three phases are uniformly distributed, namely the second phase at 120° and a third phase at 240°, if the first phase is at 0°. In positive driving direction, i.e. +x-direction, the second coil 2b with coil core 3b of a drive segment of the linear drive unit located next to the first coil 2a with coil core 3a is connected between the second phase and the third phase, and in positive driving direction, i.e. +x-direction, the third coil 2c with coil core 3c located next to the second coil 2b with coil core 3b is connected between the third phase and the first phase. The drive segments of the linear drive unit, located adjacent such a drive segment of the linear drive unit, are connected in the same way to the three phases of the three phase system.

If, analogously to the disposition in a two-pole direct current motor, phase angles are assigned to the pole raster formed by the permanent magnets, the linear coil arrangements could be depicted in a circular phase diagram. As this diagram can be interpreted magnetically for the driving effect on the permanent magnets as well as electrically for the activation of the coils, it allows to consistently describe the correlation between switching states and driving effect.

Figure 3:
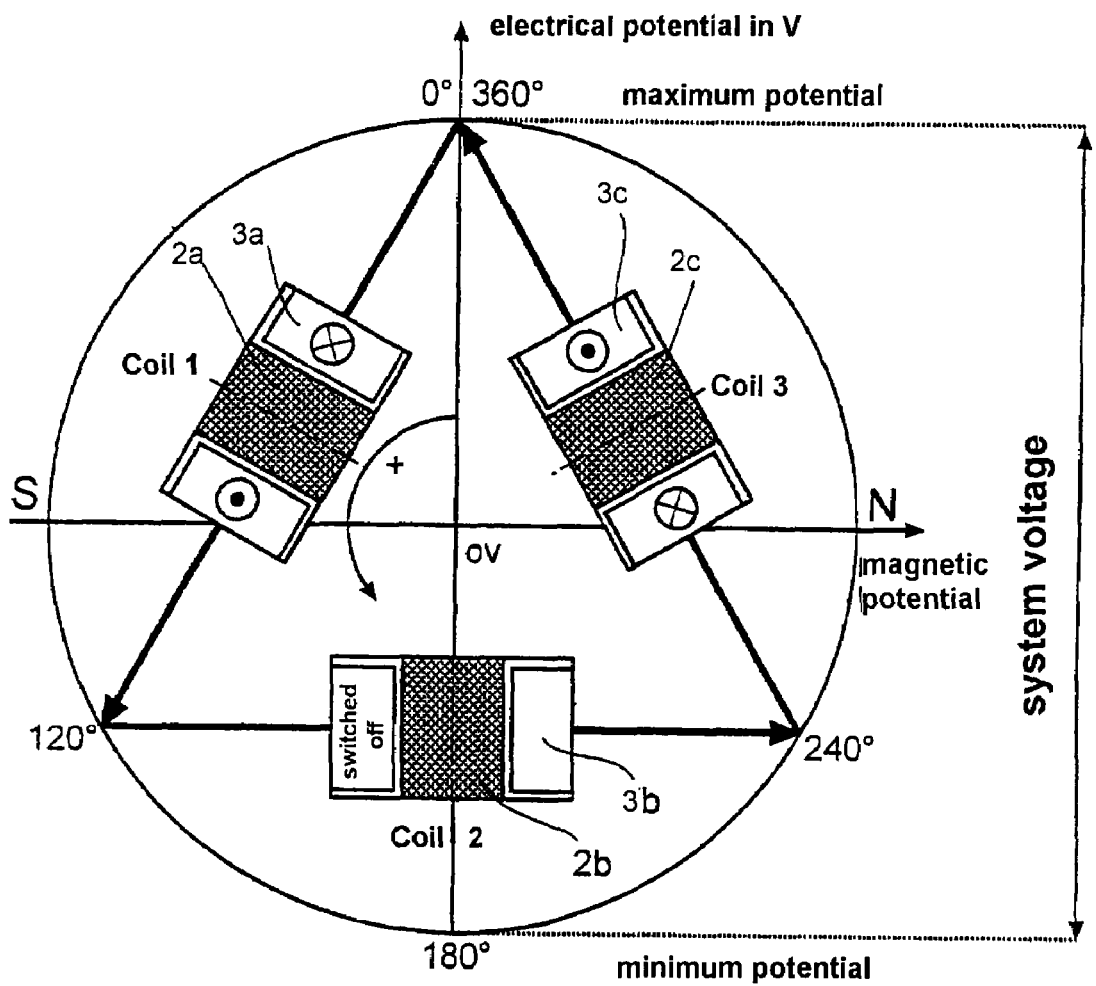
FIG. 3 shows a diagram explaining a first possibility of the voltage curve of the coils interconnected as shown in FIG. 2 of the inventively used drive system.

Such a circular phase diagram with coils drawn-in is shown in FIG. 3. In this case, the electrical potential in V is indicated on the ordinate and the magnetic potential is indicated on the abscissa. A circle around the origin of this coordinate system, which represents a zero potential for both the electrical potential and the magnetic potential, represents the phase positions of the voltage applied to the respective coils, a 0° phase position being given at the intersection of the circle with the positive ordinate, and the phase changing counter-clockwise to a 90° phase position, at the intersection of the circle with the negative abscissa, which represents the magnetic potential of the south pole, to a 180° phase position at the intersection of the circle with the negative ordinate, which represents the minimum electric potential, to a 270° phase position at the intersection of the circle with the positive abscissa, which represents the magnetic potential of the north pole, and up to a 360° phase position, equivalent to the 0° phase position, at the intersection of the circle with the positive ordinate, which represents the maximum electric potential.

As shown in FIG. 2, a relationship is given, in which the first coil 2a with coil core 3a is located between a 0° phase position and a 120° phase position, the second coil 2b with coil core 3b between a 120° phase position and a 240° phase position and the third coil 2c with coil core 3c between a 240° phase position and a 360° phase position. With three-phase operation, the phasors of these coils will then turn counter-clockwise according to the changing frequency of the three-phase current, wherein a respective voltage, corresponding to the electrical potential difference between the start and end points of the phasor projected on the ordinate, is applied to the coils.

In the magnetic interpretation of the phase diagram, a 180° phase pass corresponds to a displacement of the rotor over the distance between the centres of two adjacent magnets, namely the magnet raster $R_M$. During a displacement about the magnet raster $R_M$, a change of polarity is effected on account of the alternating polarization of the magnets in the rotor. After a 360° phase pass, the rotor displacement amounts to two $R_M$. In this case, the magnets are again in the initial position in relation to the raster $R_S$ of the stator coils, comparable to a 360° rotation of the rotor of a two pole direct current motor.

For the electrical interpretation of the phase diagram the ordinate is considered, on which the applied electric potential is illustrated. The maximum potential is applied at 0°, the minimum potential at 180°, and a medium electric potential at 90° or 270°. As already mentioned above, in the diagram, the coils are illustrated by arrows, their start and end points illustrating the contactings. The respectively applied coil voltage can be read on the potential axis through projection of the start and end points of the arrows. The direction of current flow and thus the direction of magnetization of the coil is determined by the direction of the arrows.

Figure 4:
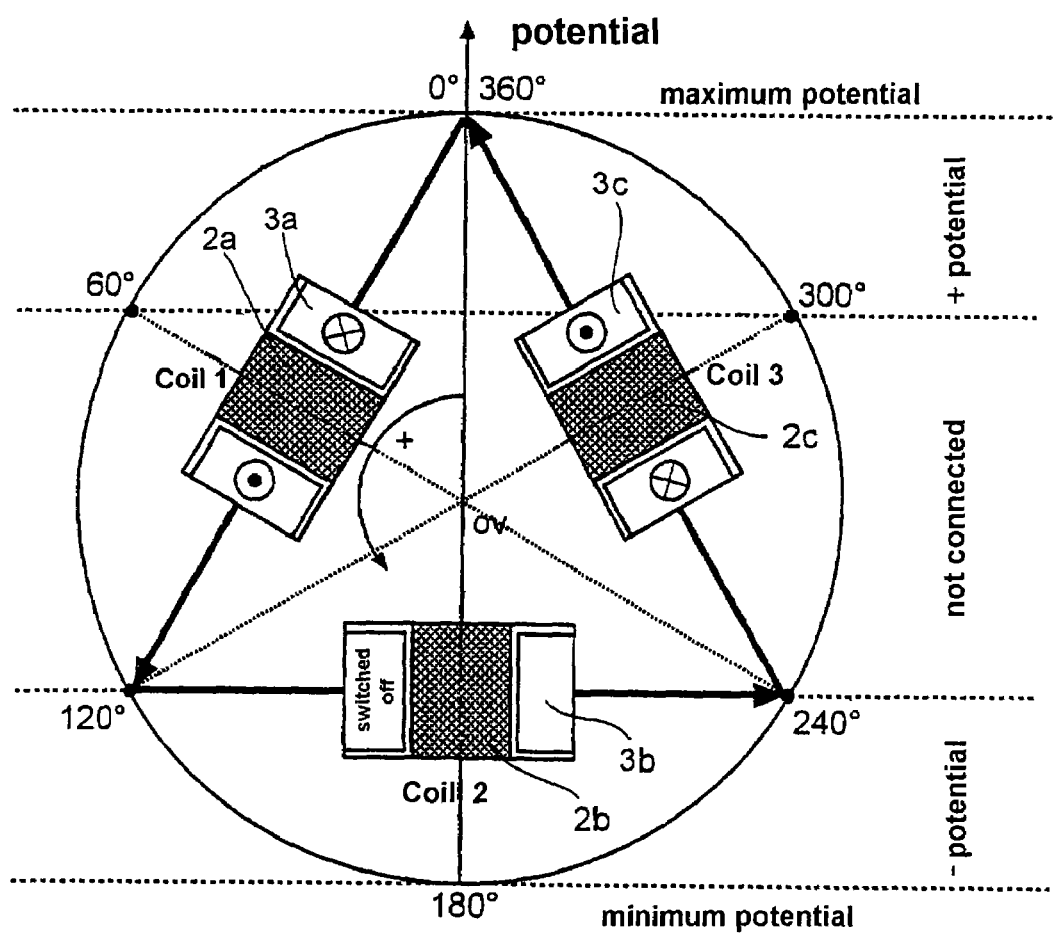
FIG. 4 shows a diagram explaining a second possibility of the voltage curve of the coils interconnected as shown in FIG. 2 of the inventively used drive system.

Instead of a continuous sinusoidal voltage source, which has a phase diagram according to FIG. 3, a control having a rectangular characteristic can be employed for reasons of costs. In a corresponding phase diagram, which is shown in FIG. 4, the rectangular characteristic is illustrated through switching thresholds. In this case, the phase connections can hold the three states: positive potential, negative potential and potential-free, respectively. In this case, the positive potential is e.g. in a range between 300° and 60° and the negative potential in a range between 120° and 240° and the ranges between 60° and 120° as well as 240° and 300° represent the potential-free condition, in which the coils are not connected. With the rectangular voltage activation, in comparison to the sinusoidal control, the more non-uniform thrust is a drawback.

Figure 5:
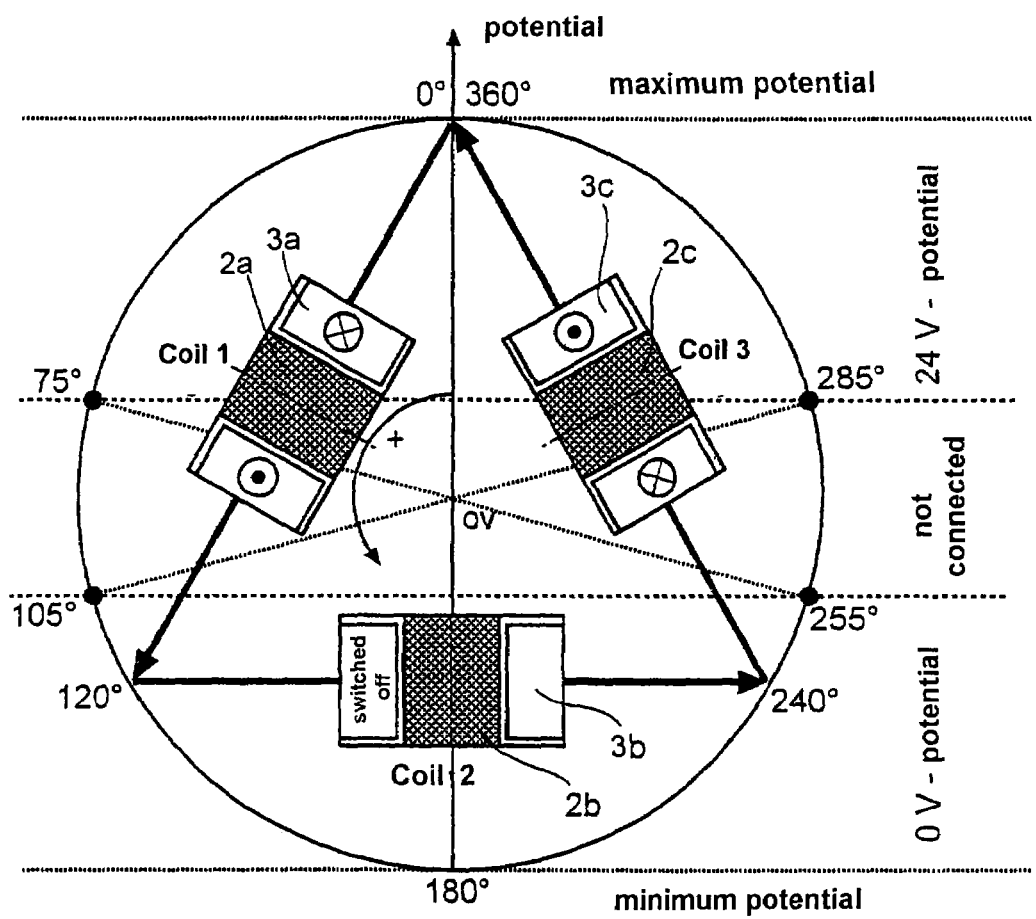
FIG. 5 shows a diagram explaining a third possibility of the voltage curve of the coils interconnected as shown in FIG. 2 of the inventively used drive system.

It is of course possible to conceive numerous other coil configurations and potential distributions, e.g. the potential distribution shown in FIG. 5, wherein a minimum potential of 0 V is given in a range between 105° and 255°, a maximum potential of 24 V in a range of 285° to 75° and potential-free ranges from 75° to 105° and from 255° to 285°.

Through appropriate activations according to the above explained principles, different travel speeds and travel paths can be obtained. For this purpose, position sensors can be provided for the individual door leaves, or controls can be conceived functioning without position sensors, where the position of the door leaves is estimated.

Figure 6:
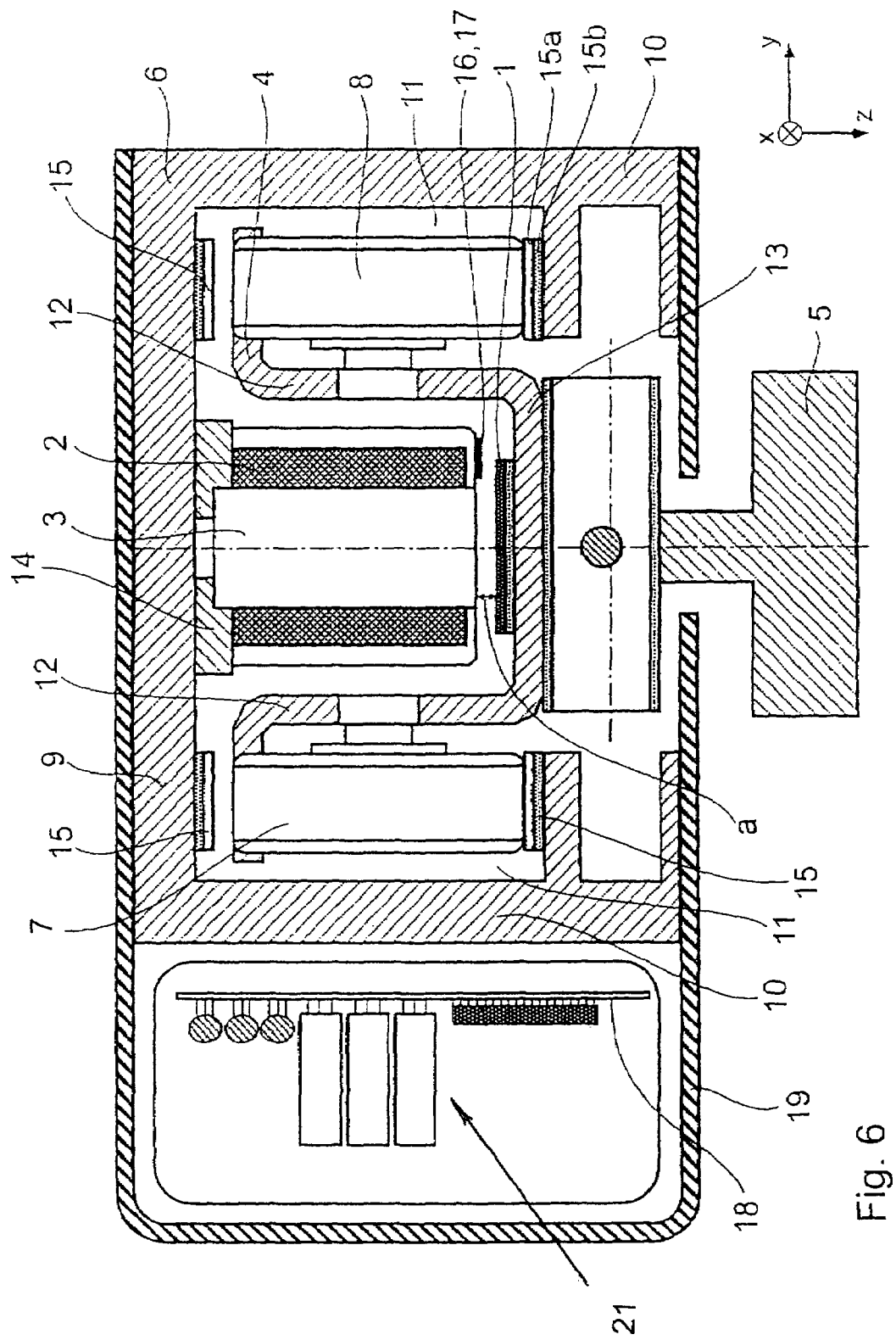
FIG. 6 shows a cross-sectional illustration of a sliding door according to a preferred embodiment according to the invention.
Figure 7C:
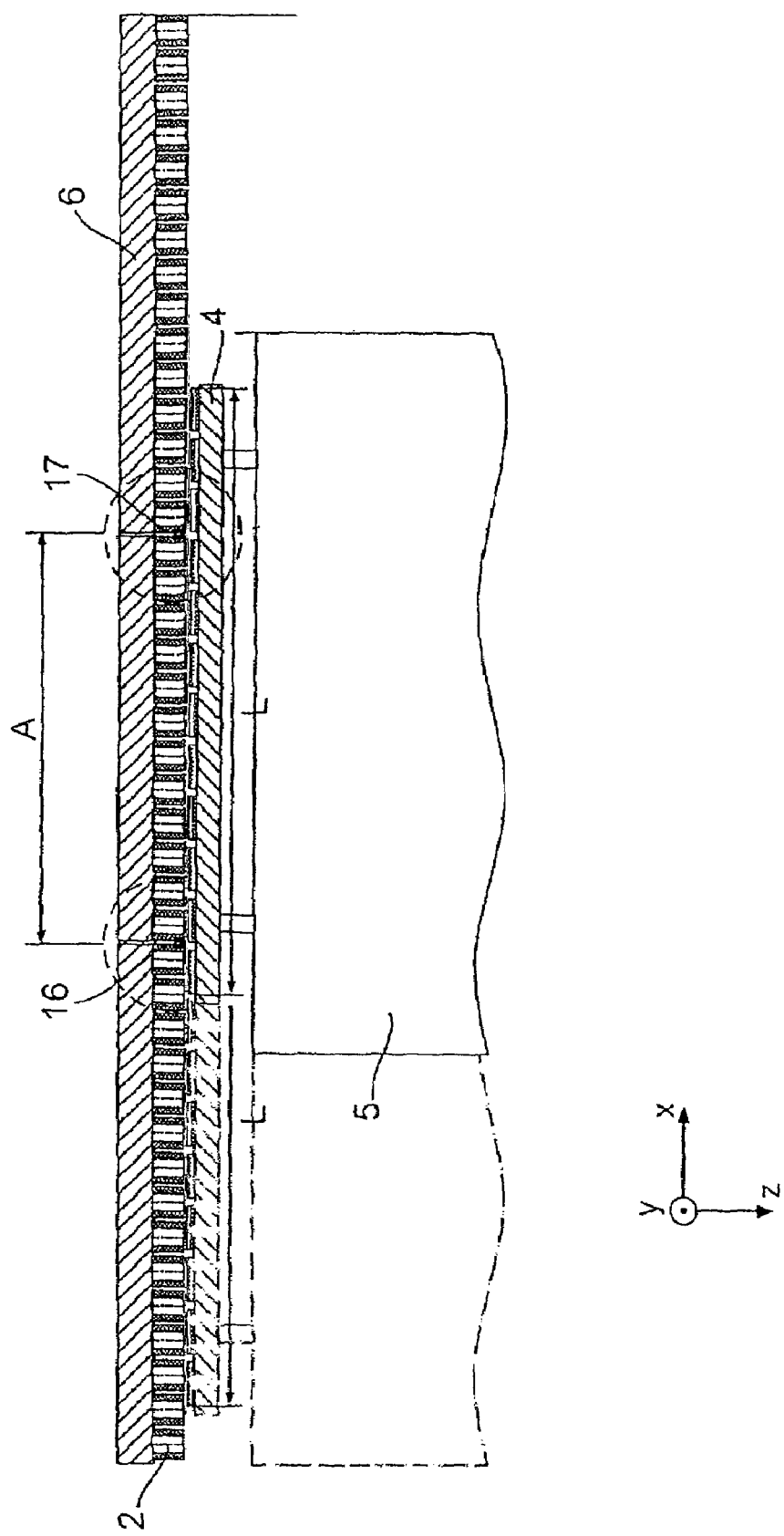
FIG. 7c shows the door leaf being positioned under the position sensors.
Figure 7D:
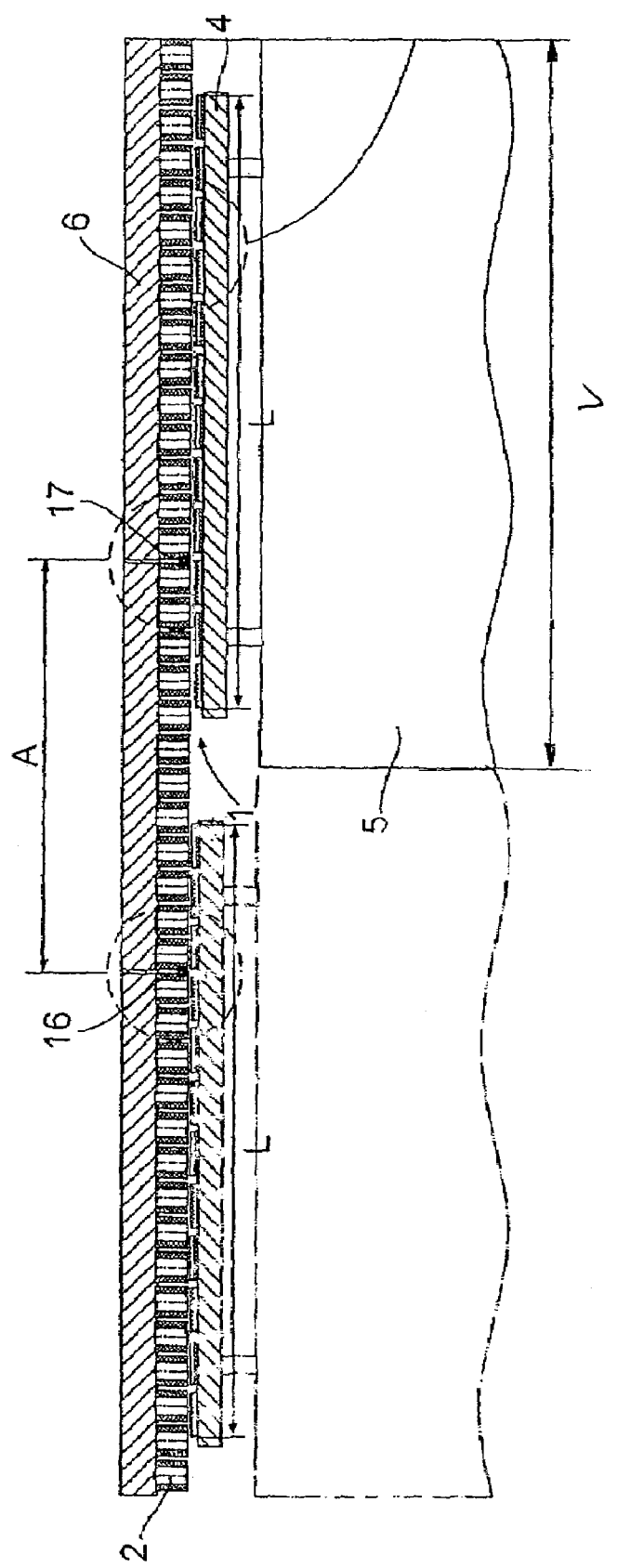
FIG. 7d shows the door leaf being positioned to the right end of the carrying profile.

FIG. 6 shows a cross-section through a carrying and drive device of a sliding door according to a preferred embodiment according to the invention.

An inverted, substantially U-shaped carrying profile 6 has a top 9 and two lateral sections 10 standing vertically thereon, which have respective apertures 11, wherein, attached to the carrying slide 4, assemblies 7, 8 of individual rollers are running, which effect a vertical guidance. In this case, two identical assemblies 7, 8 of individual rollers are chosen, a left assembly 7 in positive transverse direction y being located on the left side of a right assembly 8. The left assembly 7, in positive transverse direction y, is attached to the carrying slide 4 on the left side and the right assembly 8 in positive transverse direction y to the carrying slide 4 on the right side.

The row of magnets 1 is disposed at the bottom 13 of the carrying slide 4 within this basically U-shaped carrying slide 4, at the lateral sections 12 thereof the assemblies 7, 8 of individual rollers being attached. A coil arrangement, consisting of coils 2 and coil cores 3 and being attached to the top 9 of the carrying profile 6, is disposed between the lateral sections 12 of the carrying slide 4 while maintaining a gap-shaped distance a with regard to the row of magnets 1. As the carrying profile 6 can be made from a non-magnetic material, e.g. aluminium, a soft-magnetic return flux rail 14, having bores through which the coil cores 3 are attached to the bottom 9 of the carrying profile 6, is disposed between the coil arrangement 2, 3 and the carrying profile 6. The coil cores 3 and the soft-magnetic return flux rail 14 can be integral as well.

For stabilizing purposes, the U-shaped carrying slide 4, which is principally open to the top, i.e. in the negative carrying direction, namely the z-direction, has ribs projecting in transverse direction, i.e. in the positive and negative y-direction, at the top edges of its lateral sections 12, which ribs are interrupted in the area of the individual rollers of the assemblies 7, 8 of the roller assembly.

In this embodiment of the invention the apertures 11 of the carrying profile 6 are disposed adjacent the coils 2 and the coil cores 3 in vertical direction, whereby the carrying slide 4 is formed in that not only the row of magnets 1 attached thereto is disposed within its lateral sections 12, but also parts of the coils 2 and of the coil cores 3 attached at the carrying profile 6. Hereby a particularly flat construction style is achieved.

Furthermore, the apertures 11 are provided with running surfaces 15, which are configured in that a rolling of the individual rollers of the assemblies 7, 8 of the roller assembly is silent. For this purpose, the running surfaces 15 may consist of two or more material compounds, e.g. of a soft damping layer 15b provided at the carrying profile 6, and of a hard running layer 15a, on which the individual rollers run.

Furthermore, a horizontal guiding element (not shown), which maintains the carrying slide 4 in a stable position in the y-direction, is provided at the carrying slide 4.

Position sensors 16, 17 of a displacement measuring system are mounted opposite the row of magnets 1 between the individual coils 2 and protruding downward therefrom, for which system the row of magnets 1 serves as a measuring scale, in order to determine the position of the carrying slide 4 running in the carrying profile 6.

A casing 19 is furthermore provided surrounding the carrying profile 6, within which also a circuitry 18 for activating the linear drive unit is accommodated, which circuitry has a control 21 for activating the individual coils 2 and is electrically connected to the position sensors 16, 17 of the displacement measuring system, to the coils 2 of the coil arrangement, to a power supply unit (not shown) and to a sensory system (not shown) for initiating the opening and closing of the inventive sliding door.

According to the invention, the row of magnets 1 may be of course attached to the carrying profile 6 and the coil unit consisting of the coils, 2, the coil cores 3 and perhaps of a soft-magnetic return flux rail 14, may be attached to the carrying slide 4.

By selecting the activated individual coils 2, the control 21 can move one or more door leaves 5, i.e. move carrying slides 4 respectively provided with one row of magnets 1.

FIGS. 7a to 7d shows a first preferred embodiment of the disposition of position sensors according to the invention.

In this embodiment, two magnetically sensitive position sensors 16, 17 are inserted between the individual coils 2 at the carrying profile 6, between which sensors a distance A is larger than the difference between the length L of the row of magnets 1 at the carrying slide 4, i.e. at the rotor, and the displacement path (V) of the door, and smaller than the length L of the row of magnets 1 of the rotor.

Figure 11:
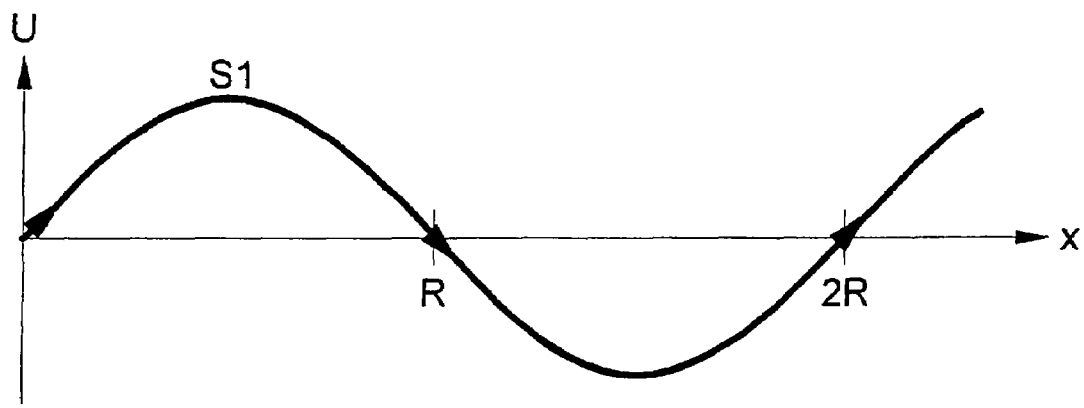
FIG. 11 shows an output signal of a position sensor according to the invention.

It is further shown in a detail enlargement (see FIG. 7b) that the individual magnets of the row of magnets 1 have a pole distance R and the individual coils 2 of the coil arrangement have a distance SP with regard to each other. The position sensors 16, 17 respectively emit a measuring signal S1 which is shown in FIG. 11.

FIG. 8a shows a second preferred embodiment of the disposition of position sensors according to the invention, In contrast to the first preferred embodiment shown in FIGS. 7a to 7d, here each position sensor 16, 17 does not consist of only one individual sensor, but of three individual sensors 16a, 16b, 16c, 17a, 17b, 17c, which are spaced apart with regard to each other in the direction of travelling x. In this embodiment, the distance A is defined between the spaced apart adjacent individual sensors of the position sensors, namely through the right individual sensor 16c of the left position sensor 16 and the left individual sensor 17a of the right position sensor 17. According to the invention, this distance A is again larger than the difference between the length L of the row of magnets 1 at the carrying slide 4, i.e. the rotor, and the travel path V of the door, and smaller than the length L of the row of magnets 1 of the rotor.

Figure 13:
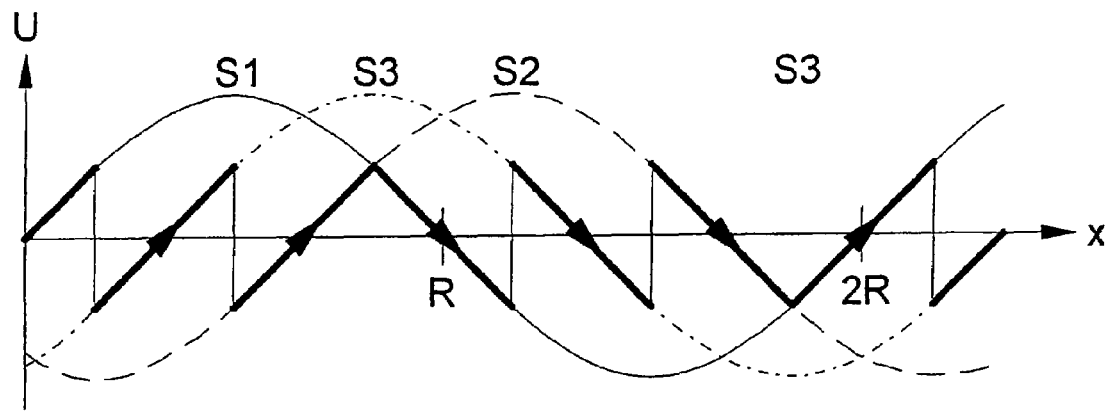
FIG. 13 shows output signals of three individual sensors of a position sensor according to the invention and a signal resulting from the position sensor consisting of three individual sensors.

In a detail enlargement (see FIG. 8b) it is further shown that the individual magnets of the row of magnets 1 have a pole distance R and the individual coils 2 of the coil arrangement, as well as the adjacent individual sensors 16a, 16b, 16c, 17a, 17b, 17c of a position sensor 16, 17 have a distance ⅔ R with regard to each other. The left individual position sensors 16a, 17a each emit a measuring signal S1, the central individual position sensors 16b, 17b each emit a measuring signal S2, and the right individual position sensors 16c, 17c each emit a measuring signal S3, which are shown in FIG. 13 together with the resulting measuring signal, drawn in bold, in which always the steepest signal portions of the measuring signals emitted by the individual sensors 16a, 16b, 16c, 17a, 17b, 17c of a position sensor 16, 17 are used.

Figure 12:
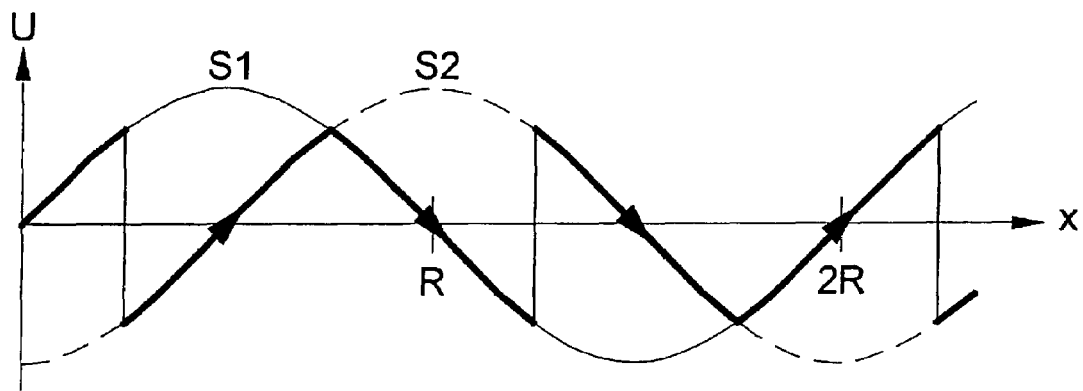
FIG. 12 shows output signals of two individual sensors of a position sensor according to the invention and a signal resulting from the position sensor consisting of two individual sensors.

FIG. 12 shows the corresponding signal curves and the resulting measuring signal, drawn in bold, with two individual sensors being used for each position sensor.

In the two previously described preferred embodiments, at least two magnetically sensitive position sensors, consisting of one or more individual sensors, have a magnetic pole distance A, which is at least larger by the magnetic pole distance R than the difference between the length of the row of magnets L and the travel path V and is likewise at least smaller by a magnetic pole distance R than the length L of the row of magnets 1 of the rotor, in order to achieve a reliable superimposition of the at least two measuring ranges. Furthermore, the at least two magnetically sensitive position sensors, consisting of one or more individual sensors, have a distance A, which is a multiple of the coil distance SP and simultaneously a multiple of the magnetic pole distance R.

Figure 14:
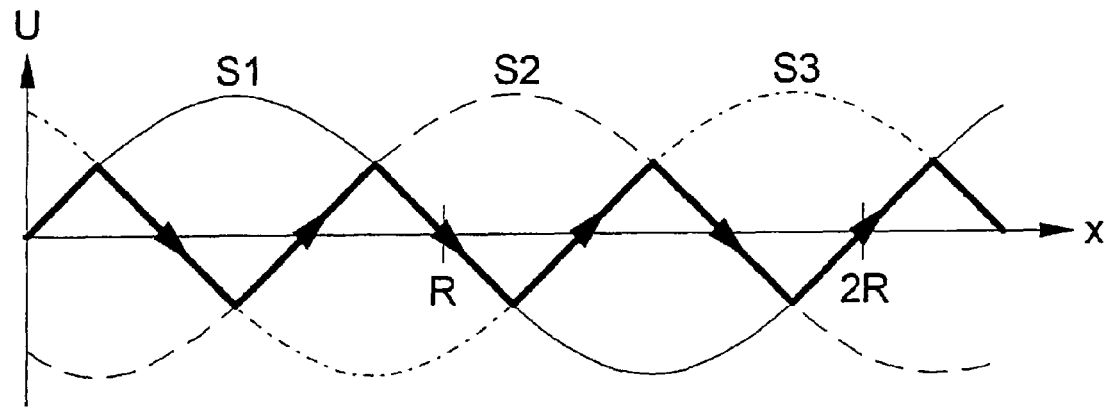
FIG. 14 shows output signals of three individual sensors of a position sensor according to the invention and a signal resulting from the position sensor consisting of three individual sensors.

FIG. 9a shows a third preferred embodiment of the disposition of position sensors according to the invention, In this case in contrast to the second preferred embodiment according to the invention, the magnetic pole distance R is chosen to be smaller, in particular half the size, than in the second preferred embodiment according to the invention. As a result further shown in a detail enlargement (see FIG. 9b), the individual magnets of the row of magnets 1 have a pole distance R and the individual coils 2 of the coil arrangement have a distance of ⅘ R with regard to each other. The adjacent individual sensors 16a, 16b, 16c, 17a, 17b, 17c of a position sensor 16, 17 continue to have a distance ⅔ R with regard to each other. This results in measuring signals of individual sensors 16a, 16b, 16c, 17a, 17b, 17c of a position sensor 16, 17 as shown in FIG. 14, and in the sectional almost linear measuring signal, drawn in bold, in which always the steepest signal portions of the measuring signals emitted by the individual sensors 16a, 16b, 16c, 17a, 17b, 17c of a position sensor 16, 17 are used, which signal is synchronous to the advance switching frequency of a three-phase linear motor.

FIG. 10a shows a fourth preferred embodiment of the disposition of position sensors according to the invention, In this case, in contrast to the third preferred embodiment according to the invention, the distance of the adjacent individual sensors 16a, 16b, 16c, 17a, 17b, 17c of a position sensor 16, 17 is chosen to be ⅘ R, like the distance of the adjacent individual coils 2 of the coil arrangement (see FIG. 10b), whereby the individual sensors can be disposed between the individual coils 2.

FIG. 15a shows a fifth preferred embodiment of the disposition of position sensors according to the invention, In this case, in contrast to the third preferred embodiment according to the invention, the coil arrangement is interrupted in the area of the position sensors 16, 17, whereby a gap is realized, which corresponds to three individual coils, that is to say that for each of the position sensors 16, 17, comprising three individual sensors 16a, 16b, 16c, 17a, 17b, 17c, a gap of 4 R is realized. The position sensors 16, 17 are disposed respectively in the centre of this gap, whereby a distance of ⅘ R from the exterior individual sensors 16a, 16c, 17a, 17c to the adjacent individual coils 2 is given (see FIG. 15b).

Figures 16A, 16B:
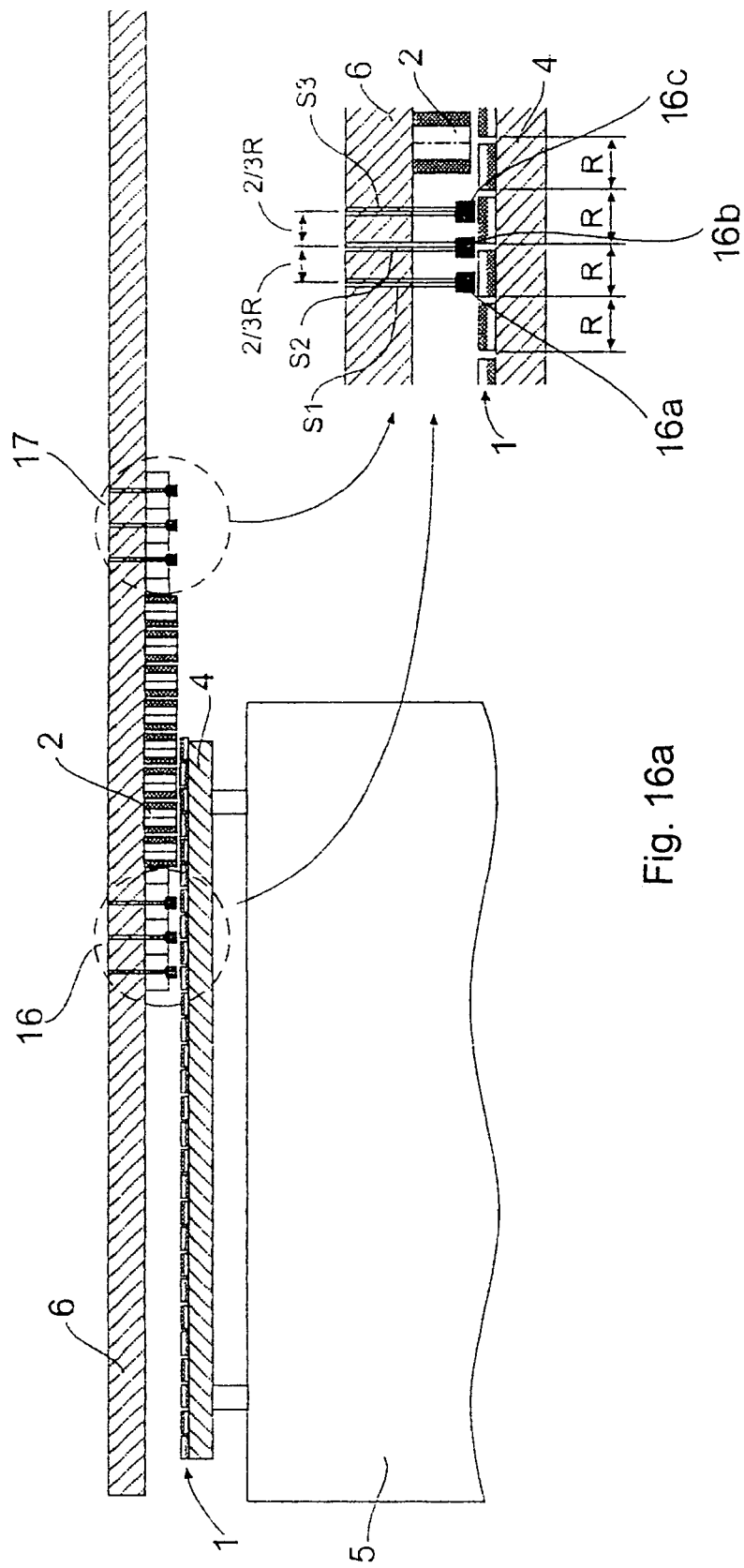
FIGS. 16a and 16b show a sixth preferred embodiment of the disposition of position sensors according to the invention.

FIG. 16a shows a sixth preferred embodiment of the disposition of position sensors according to the invention, In this case, in contrast to the fifth preferred embodiment according to the invention, the coil arrangement is not interrupted in the area of the position sensors 16, 17, but simply located in the position between the position sensors 16, 17 corresponding to the fifth embodiment.

In this case, the detail enlargement (see FIG. 16b) simply shows the left position sensor 17, in which the distance to the individual coil 2, located to the right thereto, amounts to ⅘ R. The right position sensor 16 has a corresponding structural conception, wherein the distance to the individual coil 2, located on the left side thereto, amounts to ⅘ R.

Figures 17A, 17B, 17C:
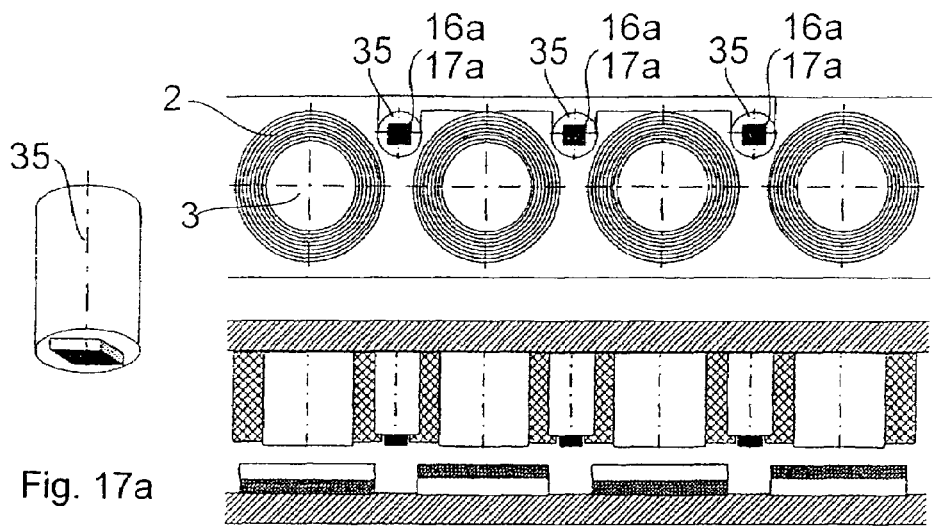
FIGS. 17a to 17c show the use of magnetic field conducting keepers according to a first configuration of the invention.

FIGS. 17a to 17c show the use of magnetic field conducting keepers according to a first configuration of the invention, The shown magnetically conducting keepers 35 respectively consist of a solid cylinder of a soft-magnetic material, such as iron or steel, and are disposed parallel to the coil cores 3, on which frontal face, located opposite the row of magnets 1, respectively one individual sensor 16a, 16b, 16c, 17a, 17b, 17c of a position sensor 16, 17 is disposed. The magnetically conducting keepers 35 improve the field closing of the individual magnets of the row of magnets 1 via the magnetically sensitive individual sensors 16a, 16b, 16c, 17a, 17b, 17c, and hereby a magnetic field strengthening effect is achieved in the area of the sensor.

Figures 18A, 18B, 18C:
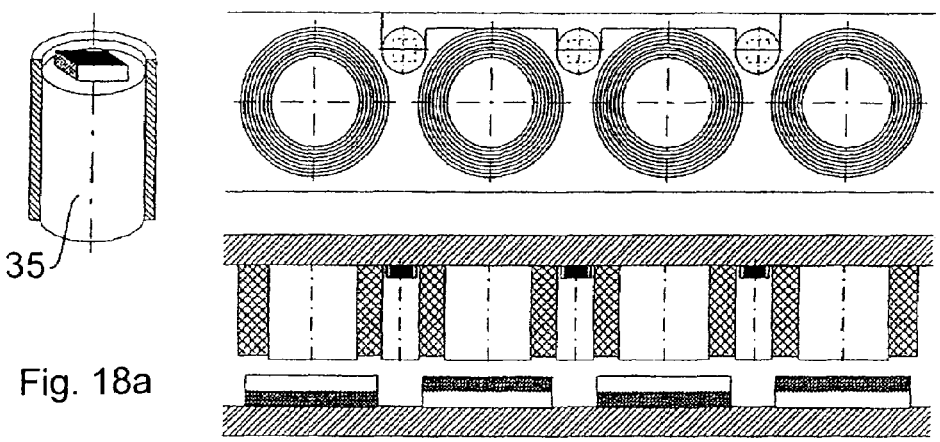
FIGS. 18a to 18c show the use of magnetic field conducting keepers according to a second configuration of the invention.
Figures 19A, 19B, 19C:
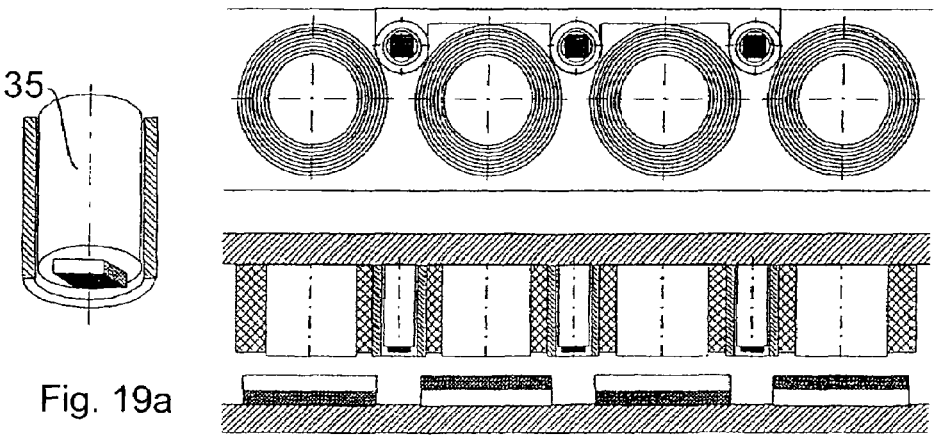
FIGS. 19a to 19c the use of shielding elements according to the invention.
Figure 21:
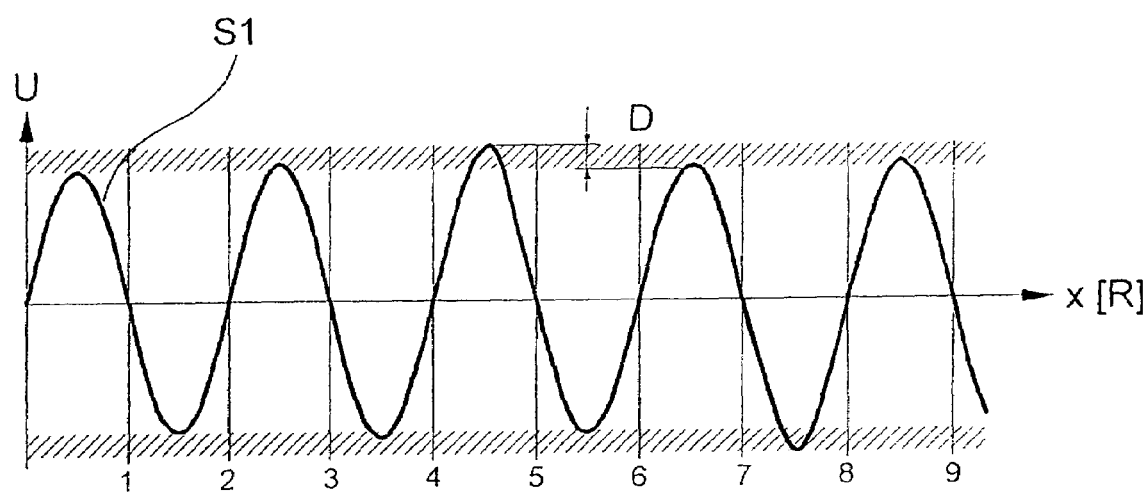
FIG. 21 shows an output signal of a position sensor according to the state-of-the-art.
Figures 22A, 22B:
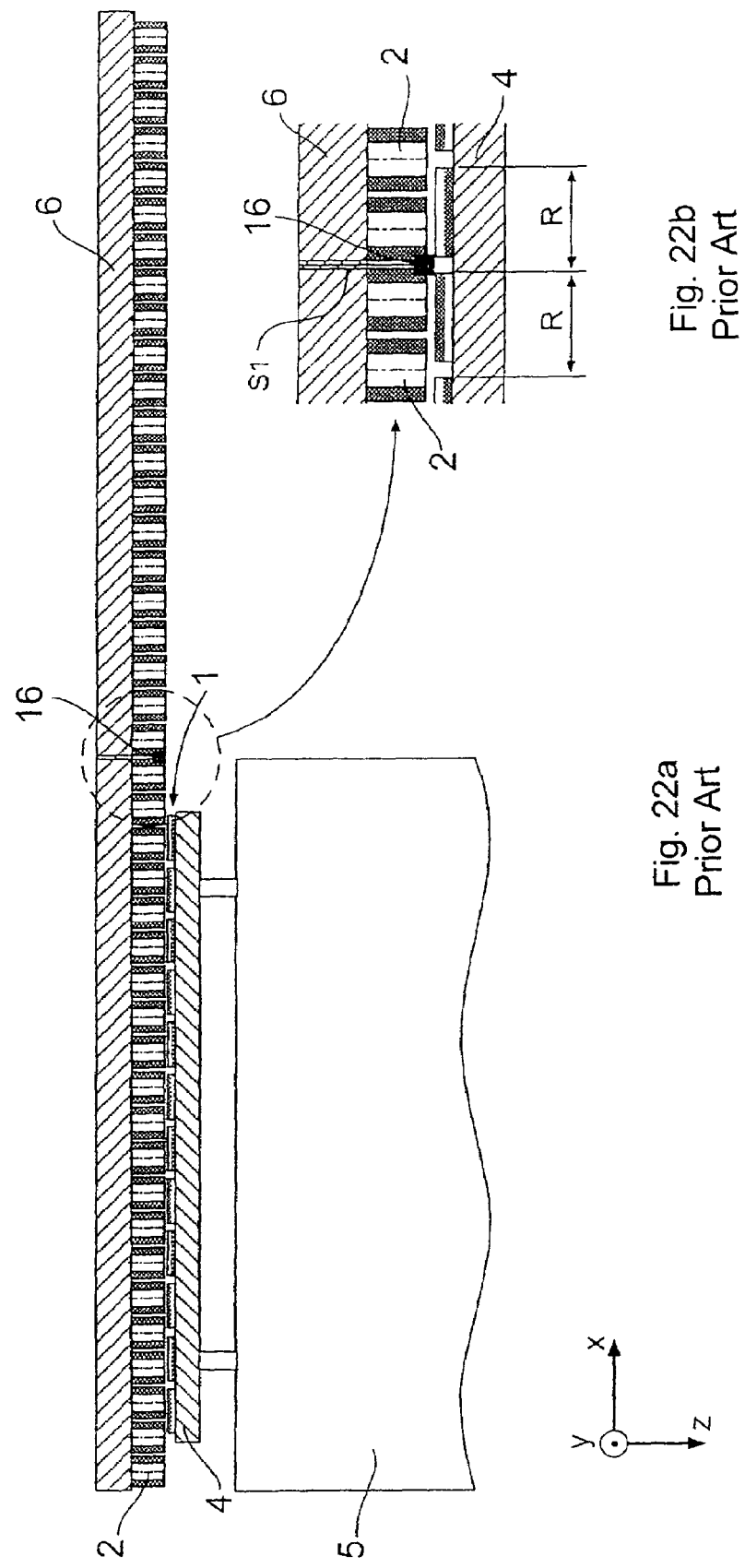
FIGS. 22a and 22b show a second embodiment of the disposition of position sensors according to the state-of-the-art.

FIGS. 18a to 18c show the use of magnetic field conducting keepers according to a second configuration of the invention, In this case in contrast to the use of magnetic field conducting keepers according to a first configuration of the invention shown in FIG. 17c, a respective individual sensor 16a, 16b, 16c, 17a, 17b, 17c of a position sensor 16, 17 is disposed on the frontal face of the solid cylinder oriented away from the row of magnets 1.

19a to 19c show the use of shielding elements according to the invention.

The shown shielding elements 36 consist of a shielding plate, which is disposed around the magnetically conducting keeper 35 and protrudes from the latter by at least the height of an individual sensor 16a, 16b, 16c, 17a, 17b, 17c of a position sensor 16, 17 and is made from magnetic field conducting material, such as iron or steel. Shown is the disposition of the shielding elements 36 in place with the keepers 35 of a first configuration according to the invention. Naturally, a disposition of the shielding elements 36 with the keepers 35 of the second configuration according to the invention is also possible (see FIG. 18a).

What is claimed is:

1. A magnetic drive system for driving a door leaf of a sliding door in a driving direction, comprising:
   a carrying slide for carrying the door leaf;
   a row of magnets supported by the carrying slide and disposed in the driving direction, the row of magnets having a length L and a longitudinal direction, the magnets being arranged so that magnetizations of the magnets reverse at a predetermined interval in the longitudinal direction;

a coil arrangement comprising a plurality of coil cores and a plurality of coils which are wound around respective coil cores, the carrying slide being movable relative to the coil arrangement along a travel path V; and a displacement measuring system cooperating with the row of magnets as a magnetic measuring scale for measuring a position of the carrying slide along the travel path V, the displacement measuring system comprising a first magnetically sensitive position sensor and a second, adjacent magnetically sensitive position sensor which is separated from the first position sensor by a distance A, the adjacent first and second position sensors being separated by at least one of the plurality of coils, wherein when energized, the coils interact with the magnets to generate a thrust force for driving the carrying slide in the driving direction along the travel path, wherein the distance A is larger than the difference between the length L and the travel path V and smaller than the length L, and wherein the first and second position sensors are disposed so that the travel path V is subdivided into two measuring ranges of the first and second position sensors.

2. The drive system of claim 1, wherein two adjacent magnets of the row of magnets have a magnetic pole distance R, the distance A being larger, by at least one such magnetic pole distance R, than the difference between the length L and the travel path V and being smaller, by at least one such magnetic pole distance R, than the length L.

3. The drive system of claim 1, wherein two adjacent magnets of the row of magnets have a magnetic pole distance R and two adjacent coils have a coil distance SP, the distance A being a multiple of the magnetic pole distance R and being a multiple of the coil distance SP.

4. The drive system of claim 1, wherein each of the first and second position sensors comprises at least one of a Hall sensor and a magneto-resistive sensor.

5. The drive system of claim 1, wherein each of the first and second position sensors comprises a plurality of magnetically sensitive sensors.

6. The drive system of claim 5, wherein the plural magnetically sensitive sensors of each of the first and second position sensors are disposed so that during operation at least one of the plural magnetically sensitive sensors has a steep functional course.

7. The drive system of claim 5, wherein during operation the drive system has a number of electrical phases, the number of the plural magnetically sensitive sensors of each of the first and second position sensors corresponding to the number of electrical phases.

8. The drive system of claim 5, wherein two adjacent magnets of the row of magnets have a magnetic pole distance R, the plural magnetically sensitive sensors of each of the first and second position sensors being disposed at a fixed distance with respect to each other, the fixed distance being equal to or being a multiple of a quotient of the magnetic pole distance R and a number of the plural magnetically sensitive sensors.

9. The drive system of claim 1, wherein each of the first and second position sensors measures only the direction of a magnetic field of a respective magnet independently of the strength of the magnetic field.

10. The drive system of claim 1, further comprising a plurality of magnetically conducting keepers which enhance a filed closing of the magnets by the first and second magnetically sensitive position sensors.

11. The drive system of claim 10, wherein each magnetically conducting keeper comprises a soft magnetic material.

12. The drive system of claim 1, further comprising a plurality of shielding elements which surround the respective first and second magnetically sensitive position sensors so that a magnetic interference between the coils and each of the first and second magnetically sensitive position sensors is reduced.

13. The drive system of claim 12, wherein each shielding element comprises a magnetic field conducting material.

14. The drive system of claim 1, wherein the coil arrangement is interrupted by the first and second position sensors with each of the first and second position sensor being spaced from an adjacent coil of the coil arrangement.

15. The drive system of claim 1, wherein the coil arrangement is disposed between the first and second position sensors, the coil arrangement being spaced from each of the first and second position sensors.

16. The drive system of claim 1, further comprising a roller assembly connected to the carrying slide for carrying the carrying slide, the roller assembly maintaining a pre-determined distance between the row of magnets and the coil arrangement.

17. The drive system of claim 1, wherein the carrying slide has a carrying direction, each magnet being magnetized parallel to the carrying direction and perpendicularly to the driving direction.

18. The drive system of claim 1, wherein each magnet comprises a high energy magnet.

19. The drive system of claim 18, wherein the high energy magnet comprises a rare-earth high energy magnet.

20. The drive system of claim 19, wherein the rare-earth high energy magnet comprises NeFeB or $Sm_2Co$.

21. The drive system of claim 1, wherein the door leaf is attached to the carrying slide, the door leaf being a curved sliding door or a rectilinear sliding wall.

* * * * *